(12) United States Patent
Peng

(10) Patent No.: US 12,063,562 B2
(45) Date of Patent: Aug. 13, 2024

(54) COMMUNICATION METHOD AND APPARATUS FOR RELEASING A PACKET DATA CONVERGENCE PROTOCOL ENTITY OF A DATA RADIO BEARER

(71) Applicant: HUAWEI TECHNOLOGIES CO., LTD., Guangdong (CN)

(72) Inventor: Wenjie Peng, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 332 days.

(21) Appl. No.: 17/706,668

(22) Filed: Mar. 29, 2022

(65) Prior Publication Data

US 2022/0225194 A1 Jul. 14, 2022

Related U.S. Application Data

(63) Continuation of application No. PCT/CN2019/109545, filed on Sep. 30, 2019.

(51) Int. Cl.
H04W 36/08 (2009.01)
H04W 36/00 (2009.01)
(52) U.S. Cl.
CPC ....... *H04W 36/08* (2013.01); *H04W 36/0055* (2013.01)
(58) Field of Classification Search
CPC . H04W 76/27; H04W 36/08; H04W 36/0055; H04W 36/00698; H04W 36/0069; H04W 36/0066; H04W 36/0033
See application file for complete search history.

(56) References Cited

U.S. PATENT DOCUMENTS

2015/0117286 A1 4/2015 Kim et al.
2019/0182902 A1 6/2019 Han et al.
(Continued)

FOREIGN PATENT DOCUMENTS

CN 103096400 A 5/2013
CN 103139911 A 6/2013
(Continued)

OTHER PUBLICATIONS

ZTE, "Baseline CR for TS37.340", 3GPP TSG-RAN WG3 #101bis R3-185418, Oct. 12, 2018, total 58 pages.
(Continued)

*Primary Examiner* — Allahyar Kasraian

(57) ABSTRACT

Embodiments of this application provide a communication system and apparatus, and relate to the field of communication technologies. In the communication system, a source access network device is configured to send at least one identifier of at least one first data radio bearer (DRB) to a target access network device, where the source access network device does not obtain a packet data convergence protocol (PDCP) configuration of the first DRB, and a target access network device is configured to receive the at least one identifier of the at least one first DRB from the source access network device, and obtain configuration information, where the configuration information comprises first indication information, and the first indication information indicates the terminal to release at least one PDCP entity of the at least one first DRB; and send the configuration information to the source access network device.

21 Claims, 17 Drawing Sheets

(56) References Cited

U.S. PATENT DOCUMENTS

| | | | |
|---|---|---|---|
| 2019/0261240 A1* | 8/2019 | Fang | H04W 68/005 |
| 2020/0037382 A1 | 1/2020 | Xiao et al. | |
| 2020/0120750 A1* | 4/2020 | Liu | H04W 76/15 |
| 2020/0137644 A1* | 4/2020 | Yeh | H04W 36/14 |
| 2020/0205042 A1* | 6/2020 | Ryu | H04W 36/0027 |
| 2020/0314701 A1* | 10/2020 | Talebi Fard | H04W 36/0016 |
| 2020/0366552 A1* | 11/2020 | Tsuboi | H04L 41/0803 |
| 2020/0374961 A1* | 11/2020 | Ingale | H04W 36/00698 |
| 2020/0396789 A1* | 12/2020 | Hori | H04W 28/18 |
| 2022/0232431 A1* | 7/2022 | Hsieh | H04W 36/0066 |

FOREIGN PATENT DOCUMENTS

| | | |
|---|---|---|
| CN | 103889009 A | 6/2014 |
| CN | 104969592 A | 10/2015 |
| CN | 106993313 A | 7/2017 |
| CN | 107852653 A | 3/2018 |
| CN | 108024294 A | 5/2018 |
| CN | 108605254 A | 9/2018 |
| CN | 109429288 A | 3/2019 |
| CN | 110063086 A | 7/2019 |
| CN | 110225600 A | 9/2019 |
| GB | 2528913 A | 2/2016 |
| WO | 2018059147 A1 | 4/2018 |
| WO | 2018110952 A2 | 6/2018 |

OTHER PUBLICATIONS

Huawei et al., "(TP for NR BL CR for TS 38.423): Correction of dedicated PDU Session transport resources", 3GPP TSG-RAN WG3#102 R3-186382, Nov. 16, 2018, total 18 pages.

3GPP TSG-RAN2 Meeting #107 R2-1911824, AS-ConfigNR at handover with (NG)EN-DC, Ericsson, Prague, Czech Republic, Aug. 26-30, 2019, total 6 pages.

International Search Report and Written Opinion issued in PCT/CN2019/109545, dated Jun. 23, 2020, 9 pages.

Extended European Search Report issued in EP19948141.7, dated Jul. 28, 2022, 11 pages.

Office Action issued in CN201980097027.8, dated Jul. 1, 2022, 13 pages.

* cited by examiner

COMMUNICATION METHOD AND APPARATUS FOR RELEASING A PACKET DATA CONVERGENCE PROTOCOL ENTITY OF A DATA RADIO BEARER

CROSS-REFERENCE TO RELATED APPLICATIONS

This application is a continuation of International Patent Application No. PCT/CN2019/109545, filed on Sep. 30, 2019. The disclosure of the aforementioned application is hereby incorporated by reference in its entirety.

TECHNICAL FIELD

Embodiments of this application relate to the field of communication technologies, and in particular, to a communication method and apparatus.

BACKGROUND

When user equipment (UE) works in a dual connectivity (DC) mode, the UE may perform data transmission through both a master node (MN) and a secondary node (SN). In a dual connectivity network, a packet data convergence protocol (PDCP) configuration of an SN terminated bearer is generated by the SN, and the SN may change, based on an implementation, the PDCP configuration of the SN terminated bearer for the UE. Therefore, the MN does not have the latest configuration generated by the SN for the UE.

During inter-base-station handover, to enable a target base station (for example, a target MN or a target SN) to generate an incremental configuration for the UE, before initiating the handover, a source MN may request the latest configuration from a source SN by using a modification procedure, and then trigger the handover. However, because a modification procedure between a master base station and a secondary base station needs to be triggered before a handover procedure is performed, excessively long time is required for an entire handover process, resulting in handover performance deterioration.

SUMMARY

Embodiments of this application provide a communication method and apparatus, to avoid, while ensuring handover performance, service interruption of a terminal caused by configuration inconsistency between a terminal side and a target access network device side.

To achieve the foregoing objectives, embodiments of this application use the following technical solutions.

According to a first aspect of embodiments of this application, a communication method is provided. The method includes: A source access network device sends at least one identifier of at least one first data radio bearer (DRB) to a target access network device, where the source access network device does not obtain a packet data convergence protocol (PDCP) configuration of the first DRB. The source access network device receives configuration information from the target access network device, where the configuration information includes first indication information, and the first indication information is used to indicate a terminal to release at least one PDCP entity of the at least one first DRB. The source access network device sends the configuration information to the terminal. According to this solution, the source access network device sends the at least one identifier of the at least one first DRB to the target access network device, where the source access network device does not obtain the PDCP configuration of the at least one first DRB; and receives the first indication information used by the target access network device to indicate the terminal to release the at least one PDCP entity of the at least one first DRB, so that the terminal releases at least one PDCP entity that is established on a source SN and that is unknown to the target access network device. This avoids service interruption of the terminal caused by configuration inconsistency between a terminal side and a target access network device side.

With reference to the first aspect, in a possible implementation, the configuration information further includes second indication information, and the second indication information is used to indicate the terminal to add at least one PDCP configuration of at least one second DRB. According to this solution, the target access network device indicates the terminal to add the PDCP configuration that is of the at least one second DRB and that is configured by the target access network device for the terminal, so that a configuration on the terminal side is consistent with a configuration on the target access network device side. This avoids the service interruption of the terminal and improves user experience.

With reference to the first aspect and the foregoing possible implementation, in another possible implementation, the at least one first DRB and the at least one second DRB correspond to a same radio access bearer (E-RAB). According to this solution, the at least one first DRB and the at least one second DRB correspond to the same E-RAB. To be specific, when a first DRB corresponding to an E-RAB is released, a new second DRB is correspondingly added for the E-RAB. An identifier of the first DRB may be the same as or different from an identifier of the second DRB.

With reference to the first aspect and the foregoing possible implementations, in another possible implementation, the source access network device is a source master node (MN) of the terminal during dual connectivity communication. According to this solution, before inter-base-station handover, the terminal works in a dual connectivity mode. Optionally, before inter-base-station handover, the terminal may alternatively work in a single connectivity mode.

With reference to the first aspect and the foregoing possible implementations, in another possible implementation, each of the at least one first DRB is a DRB established on the source secondary node (SN). According to this solution, before the inter-base-station handover, when the terminal works in the dual connectivity mode, the first DRB is the DRB established on the source SN. Therefore, that the source access network device does not obtain the PDCP configuration of the first DRB may mean that before initiating a handover procedure, the source MN does not initiate a modification procedure to the source SN, that is, the source MN does not obtain the PDCP configuration of the DRB established on the source SN.

With reference to the first aspect and the foregoing possible implementations, in another possible implementation, the method further includes: The source MN receives the at least one identifier of the at least one first DRB from the source SN. According to this solution, the at least one identifier that is of the at least one first DRB and that is sent by the source MN to the target access network device may be sent by the source SN to the source MN. For example, in an MR-DC network, the source MN may allocate a range of available DRB IDs to the source SN, and the source MN does not know specific DRB IDs used by the source SN.

Therefore, the source SN may send, to the source MN, the at least one identifier of the at least one first DRB established on the source SN.

According to a second aspect of embodiments of this application, a communication method is provided. The method includes: A target access network device receives at least one identifier of at least one first data radio bearer (DRB) from a source access network device, where the source access network device does not obtain a packet data convergence protocol (PDCP) configuration of the at least one first DRB. The target access network device obtains configuration information, where the configuration information includes first indication information, and the first indication information is used to indicate a terminal to release at least one PDCP entity of the at least one first DRB. The target access network device sends the configuration information to the source access network device. According to this solution, the target access network device receives the at least one identifier of the at least one first DRB, determines that the at least one first DRB is established on a source SN, and does not obtain the configuration of the at least one first DRB. Therefore, the target access network device indicates the terminal to release the at least one PDCP entity of the at least one first DRB, so that the terminal releases at least one PDCP entity that is established on the source SN and that is unknown to the target access network device. This avoids service interruption of the terminal caused by configuration inconsistency between a terminal side and a target access network device side.

With reference to the second aspect, in a possible implementation, the configuration information further includes second indication information, and the second indication information is used to indicate the terminal to add at least one PDCP configuration of at least one second DRB. According to this solution, the target access network device indicates the terminal to add the PDCP configuration that is of the at least one second DRB and that is configured by the target access network device for the terminal, so that a configuration on the terminal side is consistent with a configuration on the target access network device side. This avoids the service interruption of the terminal and improves user experience.

With reference to any one of the second aspect or the possible implementations of the second aspect, in another possible implementation, the at least one first DRB and the at least one second DRB correspond to a same radio access bearer (E-RAB). According to this solution, the at least one first DRB and the at least one second DRB correspond to the same E-RAB. To be specific, when a first DRB corresponding to an E-RAB is released, a new second DRB is correspondingly added for the E-RAB. An identifier of the first DRB may be the same as or different from an identifier of the second DRB.

With reference to any one of the second aspect or the possible implementations of the second aspect, in another possible implementation, the source access network device is a source master node (MN) of the terminal during dual connectivity communication. According to this solution, before inter-base-station handover, the terminal works in a dual connectivity mode. Optionally, before inter-base-station handover, the terminal may alternatively work in a single connectivity mode.

With reference to any one of the second aspect or the possible implementations of the second aspect, in another possible implementation, each of the at least one first DRB is a DRB established on the source secondary node (SN). According to this solution, before the inter-base-station handover, when the terminal works in the dual connectivity mode, the first DRB is the DRB established on the source SN. Therefore, that the source access network device does not obtain the PDCP configuration of the first DRB may mean that before initiating a handover procedure, the source MN does not initiate a modification procedure to the source SN, that is, the source MN does not obtain the PDCP configuration of the DRB established on the source SN.

With reference to any one of the second aspect or the possible implementations of the second aspect, in another possible implementation, the target access network device is a target MN of the terminal during the dual connectivity communication, and the method further includes: The target MN sends one or more identifiers of some or all of the at least one first DRB to a target SN. According to this solution, when the target access network device configures DC for the terminal, the target MN may send, to the target SN, the at least one identifier of the some or all of the at least one first DRB established on the source SN, so that the target SN generates an indication used to release one or more PDCP entities of the some or all of the at least one first DRB.

With reference to any one of the second aspect or the possible implementations of the second aspect, in another possible implementation, that the target access network device obtains configuration information includes: The target MN receives a third indication from the target SN, where the third indication is used to indicate the terminal to release the PDCP entity of the some or all of the at least one first DRB. According to this solution, when the target access network device configures the DC for the terminal, the target SN may generate the third indication used to indicate the terminal to release a PDCP entity of some or all of the at least one second DRB, and send the third indication to the target MN. It may be understood that the first indication information may include the third indication.

According to a third aspect of embodiments of this application, a communication method is provided. The method includes: A terminal receives configuration information from a source access network device, where the configuration information includes first indication information, the first indication information is used to indicate the terminal to release a packet data convergence protocol (PDCP) entity of at least one first data radio bearer (DRB), and the source access network device does not obtain one or more PDCP configurations of the at least one first DRB. The terminal releases the at least one PDCP entity of the at least one first DRB based on the configuration information. According to this solution, when the source access network device does not initiate a modification procedure before performing a handover procedure, the terminal may receive an indication sent by the source access network device, and release at least one PDCP entity that is established on a source SN and that is unknown to a target access network device. This avoids service interruption of the terminal caused by configuration inconsistency between a terminal side and a target access network device side.

With reference to the third aspect, in a possible implementation, the configuration information further includes second indication information, and the second indication information is used to indicate the terminal to add at least one PDCP configuration of at least one second DRB. According to this solution, the terminal adds the PDCP configuration that is of the at least one second DRB and that is configured by the target access network device for the terminal, so that a configuration on the terminal side is consistent with a configuration on the target access network device side. This avoids the service interruption of the terminal and improves user experience.

With reference to any one of the third aspect or the possible implementations of the third aspect, in another possible implementation, the at least one first DRB and the at least one second DRB correspond to a same radio access bearer (E-RAB). According to this solution, the at least one first DRB and the at least one second DRB correspond to the same E-RAB. To be specific, when a first DRB corresponding to an E-RAB is released, a new second DRB is correspondingly added for the E-RAB. An identifier of the first DRB may be the same as or different from an identifier of the second DRB.

With reference to any one of the third aspect or the possible implementations of the third aspect, in another possible implementation, the source access network device is a source master node (MN) of the terminal during dual connectivity communication. According to this solution, before inter-base-station handover, the terminal works in a dual connectivity mode. Optionally, before inter-base-station handover, the terminal may alternatively work in a single connectivity mode.

With reference to any one of the third aspect or the possible implementations of the third aspect, in another possible implementation, each of the at least one first DRB is a DRB established on the source secondary node (SN). According to this solution, before the inter-base-station handover, when the terminal works in the dual connectivity mode, the first DRB is the DRB established on the source SN. Therefore, that the source access network device does not obtain the PDCP configuration of the first DRB may mean that before initiating the handover procedure, the source MN does not initiate the modification procedure to the source SN, that is, the source MN does not obtain the PDCP configuration of the DRB established on the source SN.

According to a fourth aspect of embodiments of this application, a communication method is provided. The method includes: A source master node (MN) sends first information to a target access network device, where the first information is used to indicate that at least one data radio bearer (DRB) is established on a source secondary node (SN), and the source MN does not obtain a packet data convergence protocol (PDCP) configuration of the at least one DRB. The source MN receives first indication information from the target access network device, where the first indication information is used to indicate a terminal to release a PDCP entity of the DRB established on the source SN. The source MN sends second information to the terminal, where the second information includes the first indication information. According to this solution, the source MN sends, to the target access network device, the first information used to indicate that the at least one DRB is established on the source secondary node (SN), and receives the first indication information used by the target access network device to indicate the terminal to release at least one PDCP entity of the at least one DRB, so that the terminal releases at least one PDCP entity that is established on the source SN and that is unknown to the target access network device. This avoids service interruption of the terminal caused by configuration inconsistency between a terminal side and a target access network device side.

With reference to the fourth aspect, in a possible implementation, the first information includes an identifier of the at least one DRB. According to this solution, the first information may be delivered in a form of a DRB list. Optionally, the first information may alternatively be one-bit indication information.

With reference to any one of the fourth aspect or the possible implementations of the fourth aspect, in another possible implementation, the method further includes: The source MN receives the at least one identifier of the at least one DRB from the source SN. According to this solution, the at least one identifier that is of the at least one DRB and that is sent by the source MN to the target access network device may be sent by the source SN to the source MN. For example, in an MR-DC network, the source MN may allocate a range of available DRB IDs to the source SN, and the source MN does not know specific DRB IDs used by the source SN. Therefore, the source SN may send, to the source MN, the at least one identifier of the at least one DRB established on the source SN.

With reference to any one of the fourth aspect or the possible implementations of the fourth aspect, in another possible implementation, the target access network device is a target MN of the terminal during dual connectivity communication, and the second information further includes a full PDCP configuration configured by the target MN and/or a target SN for the terminal. According to this solution, the target access network device may configure DC for the terminal. When the target access network device configures the DC for the terminal, both the target MN and the target SN may allocate a radio resource to the terminal, or the target MN or the target SN may allocate a radio resource to the terminal.

According to a fifth aspect of embodiments of this application, a communication method is provided. The method includes: A target access network device determines that at least one first data radio bearer (DRB) is established on a source secondary node (SN), where a source master node (MN) does not obtain a packet data convergence protocol (PDCP) configuration of the at least one first DRB. The target access network device sends first indication information to the source MN, where the first indication information is used to indicate a terminal to release a PDCP entity of the DRB established on the source SN. According to this solution, the target access network device determines that the at least one first DRB is established on the source SN, and indicates the terminal to release the PDCP entity of the DRB established on the source SN. In other words, the terminal may release, based on the indication, at least one PDCP entity that is established on the source SN and that is unknown to the target access network device. This avoids service interruption of the terminal caused by radio bearer configuration inconsistency between a terminal side and a target access network device side, and improves user experience.

With reference to the fifth aspect, in a possible implementation, the method further includes: The target access network device receives first information sent by the source MN, where the first information is used to indicate that the at least one first DRB is established on the source SN. According to this solution, the target access network device may determine, based on the first information sent by the source MN, that the at least one first DRB is established on the source SN. Optionally, the target access network device may alternatively determine, based on a correspondence between an E-RAB and a DRB, that the at least one first DRB is established on the source SN.

With reference to any one of the fifth aspect or the possible implementations of the fifth aspect, in another possible implementation, the first information includes an identifier of the at least one first DRB. According to this solution, the target access network device may receive the at least one identifier that is of the at least one first DRB and that is sent by the source MN, and determine that the at least one first DRB is established on the source SN.

With reference to any one of the fifth aspect or the possible implementations of the fifth aspect, in another possible implementation, the target access network device is a target MN of the terminal during dual connectivity communication, and the method further includes: The target MN sends an SN addition request message to a target SN. The target MN receives an SN addition request acknowledgment message from the target SN, where the SN addition request acknowledgment message includes a PDCP configuration that is of at least one second DRB and that is configured by the target SN for the terminal. According to this solution, when the target access network device configures DC for the terminal, the target MN may send the SN addition request message to the target SN, to request the target SN to allocate a radio resource to the terminal.

With reference to any one of the fifth aspect or the possible implementations of the fifth aspect, in another possible implementation, the at least one first DRB and the at least one second DRB correspond to a same radio access bearer (E-RAB). According to this solution, the at least one first DRB and the at least one second DRB correspond to the same E-RAB. To be specific, when a first DRB corresponding to an E-RAB is released, a new second DRB is correspondingly added for the E-RAB. An identifier of the first DRB may be the same as or different from an identifier of the second DRB.

According to a sixth aspect of embodiments of this application, a communication method is provided. The method includes: A terminal receives first information sent by a source master node (MN), where the first information includes first indication information, the first indication information is used to indicate the terminal to release a packet data convergence protocol (PDCP) entity of a data radio bearer (DRB) established on a source secondary node (SN), and the source MN does not obtain a PDCP configuration of the at least one DRB. The terminal releases, based on the first indication information, the PDCP entity of the DRB established on the source SN. According to this solution, the terminal may release at least one PDCP entity that is established on the source SN and that is unknown to a target access network device. This avoids service interruption of the terminal caused by configuration inconsistency between a terminal side and a target access network device side.

With reference to the sixth aspect, in a possible implementation, that the terminal releases, based on the first indication information, the PDCP entity of the DRB established on the source SN includes: The terminal identifies, based on the first indication information, the DRB established on the source SN. The terminal releases the PDCP entity of the identified DRB established on the source SN. According to this solution, the terminal may identify, based on the first indication information, a DRB established on the source SN, and release a PDCP entity of the identified DRB established on the source SN. This avoids the service interruption of the terminal caused by the configuration inconsistency between the terminal side and the target access network device side.

With reference to any one of the sixth aspect or the possible implementations of the sixth aspect, in another possible implementation, the first information further includes a full PDCP configuration configured by a target MN and/or a target SN for the terminal. According to this solution, the target access network device may configure DC for the terminal. When the target access network device configures the DC for the terminal, both the target MN and the target SN may allocate a radio resource to the terminal, or the target MN or the target SN may allocate a radio resource to the terminal.

According to a seventh aspect of embodiments of this application, a communication method is provided. The method includes: A master node (MN) sends an SN modification request message to a secondary node (SN), where the SN modification request message carries a first identifier. The MN receives an SN modification request acknowledgment message from the SN, where the SN modification request acknowledgment message carries an identifier that is the same as the first identifier. According to this solution, the first identifier that can identify an SN modification procedure is carried in a secondary base station modification procedure. This avoids a configuration failure caused by confusion between a secondary base station modification procedure triggered by the MN and a secondary base station modification procedure triggered by the SN.

With reference to the seventh aspect, in a possible implementation, the method further includes: The MN receives a first SN modification required message from the SN, where the first SN modification required message carries the first identifier. According to this solution, the first SN modification required message sent by the SN carries the first identifier, so that it can be identified that the modification procedure is the secondary base station modification procedure initiated by the SN. In this case, the MN may send, to the SN based on the first SN modification required message, the SN modification request message that carries the identifier that is the same as the first identifier carried in the first SN modification required message. Therefore, after receiving the SN modification request message that carries the identifier that is the same as the first identifier, the SN may determine that the SN modification request message is not the SN modification request message in the modification procedure actively initiated by the MN, but a request message in response to the first SN modification required message sent by the SN. This avoids the configuration failure caused by the confusion between the secondary base station modification procedure triggered by the MN and the secondary base station modification procedure triggered by the SN.

With reference to any one of the seventh aspect or the possible implementations of the seventh aspect, in another possible implementation, the method further includes: The MN sends an SN modification confirm message to the SN, where the SN modification confirm message carries an identifier that is the same as the first identifier. According to this solution, a same identifier is carried in an SN modification procedure. This can avoid the configuration failure caused by the confusion between the secondary base station modification procedure triggered by the MN and the secondary base station modification procedure triggered by the SN.

With reference to any one of the seventh aspect or the possible implementations of the seventh aspect, in another possible implementation, the method further includes: The MN receives a second SN modification required message from the SN, where the second SN modification required message carries a second identifier. The MN sends an SN modification refuse message to the SN, where the SN modification refuse message carries an identifier that is the same as the second identifier. According to this solution, different identifiers are carried in SN modification procedures initiated by different network devices, so that the secondary base station modification procedure initiated by the MN can be distinguished from the secondary base station modification procedure initiated by the SN. This can avoid the configuration failure caused by the confusion between the secondary base station modification procedure triggered by the MN and the secondary base station modification procedure triggered by the SN.

According to an eighth aspect of embodiments of this application, a communication method is provided. The method includes: A secondary node (SN) receives an SN modification request message from a master node (MN), where the SN modification request message carries a first identifier. The SN sends an SN modification request acknowledgment message to the MN, where the SN modification request acknowledgment message carries an identifier that is the same as the first identifier. According to this solution, the first identifier that can identify an SN modification procedure is carried in a secondary base station modification procedure. This avoids a configuration failure caused by confusion between a secondary base station modification procedure triggered by the MN and a secondary base station modification procedure triggered by the SN.

With reference to the eighth aspect, in a possible implementation, the method further includes: The SN sends a first SN modification required message to the MN, where the first SN modification required message carries the first identifier. According to this solution, the first SN modification required message sent by the SN carries the first identifier, so that it can be identified that the modification procedure is the secondary base station modification procedure initiated by the SN. In this case, the MN may send, to the SN based on the first SN modification required message, the SN modification request message that carries the identifier that is the same as the first identifier carried in the first SN modification required message. Therefore, after receiving the SN modification request message that carries the identifier that is the same as the first identifier, the SN may determine that the SN modification request message is not the SN modification request message in the modification procedure actively initiated by the MN, but a request message in response to the first SN modification required message sent by the SN. This avoids the configuration failure caused by the confusion between the secondary base station modification procedure triggered by the MN and the secondary base station modification procedure triggered by the SN.

With reference to any one of the eighth aspect or the possible implementations of the eighth aspect, in another possible implementation, the method further includes: The SN receives an SN modification confirm message sent by the MN, where the SN modification confirm message carries an identifier that is the same as the first identifier. According to this solution, a same identifier is carried in an SN modification procedure. This can avoid the configuration failure caused by the confusion between the secondary base station modification procedure triggered by the MN and the secondary base station modification procedure triggered by the SN.

With reference to any one of the eighth aspect or the possible implementations of the eighth aspect, in another possible implementation, the method further includes: The SN sends a second SN modification required message to the MN, where the second SN modification required message carries a second identifier. The SN receives an SN modification refuse message sent by the MN, where the SN modification refuse message carries an identifier that is the same as the second identifier. According to this solution, different identifiers are carried in SN modification procedures initiated by different network devices, so that the secondary base station modification procedure initiated by the MN can be distinguished from the secondary base station modification procedure initiated by the SN. This can avoid the configuration failure caused by the confusion between the secondary base station modification procedure triggered by the MN and the secondary base station modification procedure triggered by the SN.

According to a ninth aspect of embodiments of this application, a communication method is provided. The method includes: A master node (MN) receives an SN modification required message from a secondary node (SN), where the SN modification required message carries a first identifier. The MN sends an SN modification request message to the SN, where the SN modification request message carries an identifier that is the same as the first identifier.

According to this solution, the first identifier that can identify an SN modification procedure is carried in the SN modification required message and the SN modification request message, so that an SN modification request message in a modification procedure initiated by the SN can be distinguished from an SN modification request message in a modification procedure initiated by the MN, and the SN does not mistake the SN modification request message actively initiated by the MN as an SN modification request message in response to the SN modification required message initiated by the SN. This avoids a configuration failure caused by confusion between a secondary base station modification procedure triggered by the MN and a secondary base station modification procedure triggered by the SN.

With reference to the ninth aspect, in a possible implementation, the method further includes: The MN receives an SN modification request acknowledgment message from the SN, where the SN modification request acknowledgment message carries an identifier that is the same as the first identifier. According to this solution, a same identifier is carried in an SN modification procedure. This can avoid the configuration failure caused by the confusion between the secondary base station modification procedure triggered by the MN and the secondary base station modification procedure triggered by the SN.

With reference to any one of the ninth aspect or the possible implementations of the ninth aspect, in another possible implementation, the method further includes: The MN sends an SN modification confirm message to the SN, where the SN modification confirm message carries an identifier that is the same as the first identifier. According to this solution, a same identifier is carried in an SN modification procedure. This can avoid the configuration failure caused by the confusion between the secondary base station modification procedure triggered by the MN and the secondary base station modification procedure triggered by the SN.

According to a tenth aspect of embodiments of this application, a communication method is provided. The method includes: A secondary node (SN) sends an SN modification required message to a master node (MN), where the SN modification required message carries a first identifier. The SN receives an SN modification request message from the MN, where the SN modification request message carries an identifier that is the same as the first identifier. According to this solution, the first identifier that can identify an SN modification procedure is carried in the SN modification required message and the SN modification request message, so that an SN modification request message in a modification procedure initiated by the SN can be distinguished from an SN modification request message in a modification procedure initiated by the MN, and the SN does not mistake the SN modification request message actively initiated by the MN as an SN modification request message in response to the SN modification required message initiated by the SN. This avoids a configuration failure caused by confusion between a secondary base station modification procedure triggered by the MN and a secondary base station modification procedure triggered by the SN.

With reference to the tenth aspect, in a possible implementation, the method further includes: The SN sends an SN modification request acknowledgment message to the MN, where the SN modification request acknowledgment message carries an identifier that is the same as the first identifier. According to this solution, a same identifier is carried in an SN modification procedure. This can avoid the configuration failure caused by the confusion between the secondary base station modification procedure triggered by the MN and the secondary base station modification procedure triggered by the SN.

With reference to any one of the tenth aspect or the possible implementations of the tenth aspect, in another possible implementation, the method further includes: The SN receives an SN modification confirm message from the MN, where the SN modification confirm message carries an identifier that is the same as the first identifier. According to this solution, a same identifier is carried in an SN modification procedure. This can avoid the configuration failure caused by the confusion between the secondary base station modification procedure triggered by the MN and the secondary base station modification procedure triggered by the SN.

According to an eleventh aspect, an embodiment of this application provides a communication apparatus. The apparatus has a function of implementing behavior of the terminal in the communication method according to the foregoing aspect. The function may be implemented by hardware, or may be implemented by hardware executing corresponding software. The hardware or the software includes one or more units or means corresponding to the function.

In a possible design, the apparatus includes a processor. The processor is configured to support the apparatus in performing a corresponding function of the terminal in the foregoing communication method. The apparatus may further include a memory. The memory may be coupled to the processor, and the memory stores program instructions and data that are necessary for the apparatus. Optionally, the apparatus further includes a transceiver. The transceiver is configured to support communication between the apparatus and a network element such as a relay device or an access network device. The transceiver may be an independent receiver, an independent transmitter, or a transceiver integrating a sending function and a receiving function.

In a possible implementation, the communication apparatus may be a terminal, or may be a component, for example, a chip, a chip system, or a circuit, that can be used in the terminal.

According to a twelfth aspect, an embodiment of this application provides a communication apparatus. The apparatus has a function of implementing behavior of an access network device (for example, a source access network device, a target access network device, a master node, or a secondary node) in the communication method according to the foregoing aspect. The function may be implemented by hardware, or may be implemented by hardware executing corresponding software. The hardware or the software includes one or more units or means corresponding to the function.

In a possible design, the apparatus includes a processor. The processor is configured to support the apparatus in performing a corresponding function of the access network device in the foregoing communication method. The apparatus may further include a memory. The memory may be coupled to the processor, and the memory stores program instructions and data that are necessary for the apparatus.

In a possible implementation, the communication apparatus may be an access network device, for example, a base station, or may be a component, for example, a chip, a chip system, or a circuit, that can be used in the access network device.

Optionally, the apparatus further includes a transceiver. The transceiver may be configured to: support communication between the access network device and a terminal and/or communication between the access network device and another network element, and send information or instructions in the foregoing communication method to the terminal/another network element. The transceiver may be an independent receiver, an independent transmitter, a transceiver integrating a sending function and a receiving function, or a communication interface between devices.

According to a thirteenth aspect of embodiments of this application, a computer storage medium is provided. The computer storage medium stores computer program code. When the computer program code is run on a processor, the processor is enabled to perform the communication method according to any one of the foregoing aspects.

According to a fourteenth aspect of embodiments of this application, a computer program product is provided. The program product stores computer software instructions executed by a processor, and the computer software instructions include a program used to perform the solutions in the foregoing aspects.

According to a fifteenth aspect of embodiments of this application, a communication apparatus is provided. The apparatus includes a processor, and may further include a transceiver and a memory. The transceiver is configured to send and receive information, or is configured to communicate with another network device. The memory is configured to store computer-executable instructions. The processor is configured to execute the computer-executable instructions, to implement the communication method according to any one of the foregoing aspects. The network device includes a terminal.

According to a sixteenth aspect of embodiments of this application, a communication apparatus is provided. The apparatus may exist in a product form of a chip. A structure of the apparatus includes a processor, and may further include a memory. The memory is configured to: be coupled to the processor, and store program instructions and data that are necessary for the apparatus. The processor is configured to execute the program instructions stored in the memory, to support a terminal device or a communication device in performing the method according to any one of the foregoing aspects.

According to a seventeenth aspect of embodiments of this application, a communication apparatus is provided. The apparatus may exist in a product form of a chip. A structure of the apparatus includes a processor and an interface circuit. The processor is configured to communicate with another apparatus through a receiving circuit, to enable the apparatus to perform the communication method according to any one of the foregoing aspects.

According to an eighteenth aspect of embodiments of this application, a communication system is provided. The communication system includes a source access network device and a target access network device. The source access network device is configured to perform the communication method according to the first aspect, and the target access network device is configured to perform the communication method according to the second aspect.

According to a nineteenth aspect of embodiments of this application, a communication system is provided. The communication system includes a source master node and a target access network device. The source master node is configured to perform the communication method according to the fourth aspect, and the target access network device is configured to perform the communication method according to the fifth aspect.

According to a twentieth aspect of embodiments of this application, a communication system is provided. The communication system includes a master node and a secondary node. The master node is configured to perform the communication method according to the seventh aspect, and the secondary node is configured to perform the communication method according to the eighth aspect.

According to a twenty-first aspect of embodiments of this application, a communication system is provided. The communication system includes a master node and a secondary node. The master node is configured to perform the communication method according to the ninth aspect, and the secondary node is configured to perform the communication method according to the tenth aspect.

DESCRIPTION OF EMBODIMENTS

Figure 1:
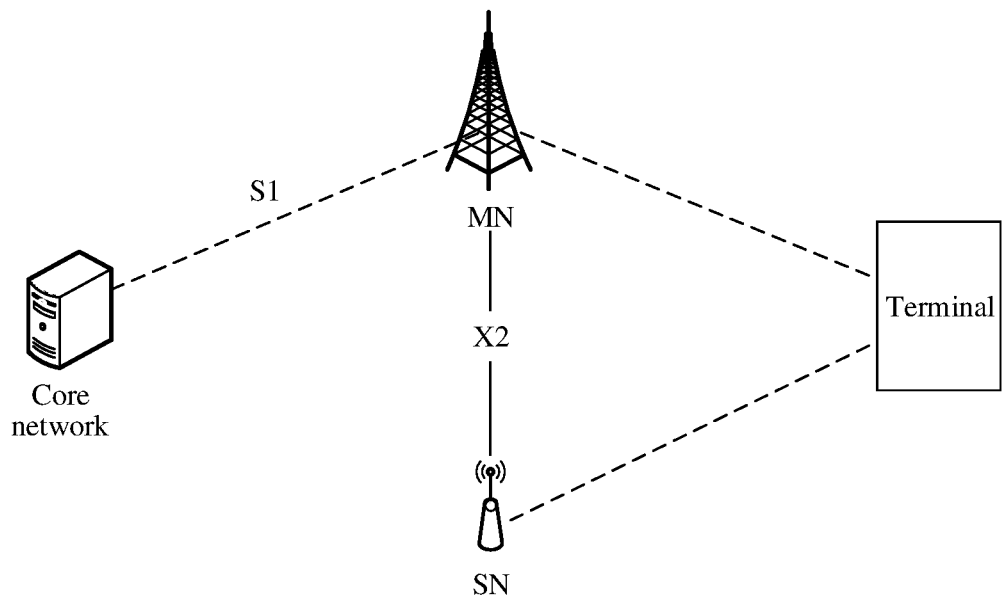
FIG. 1 is a schematic diagram of a structure of a communication system according to an embodiment of this application.

The following describes technical solutions in embodiments of this application with reference to the accompanying drawings in embodiments of this application. In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually represents an "or" relationship between the associated objects. "At least one of the following items (pieces)" or a similar expression thereof means any combination of these items, including a single item (piece) or any combination of a plurality of items (pieces). For example, at least one item (piece) of a, b, or c may represent a, b, c, a and b, a and c, b and c, or a, b, and c, where a, b, and c each may be singular or plural.

It should be noted that, in this application, the word such as "example" or "for example" is used to represent giving an example, an illustration, or a description. Any embodiment or design solution described by using "example" or "for example" in this application shall not be construed as being more preferred or having more advantages than another embodiment or design solution. Exactly, use of the word such as "example" or "for example" is intended to present a relative concept in a specific manner.

As defined in embodiments of this application, a one-way communication link from an access network to a terminal is a downlink, data transmitted on the downlink is downlink data, and a transmission direction of the downlink data is referred to as a downlink direction; and a one-way communication link from the terminal to the access network is an uplink, data transmitted on the uplink is uplink data, and a transmission direction of the uplink data is referred to as an uplink direction.

Resources in embodiments of this application may also be referred to as transmission resources, including one or more of a time domain resource, a frequency domain resource, or a code channel resource, and may be used to carry data or signaling in an uplink communication process or a downlink communication process.

It should be understood that, in embodiments of the present invention, "B corresponding to A" indicates that B is associated with A, and B can be determined based on A. However, it should be further understood that determining B based on A does not mean that B is determined based only on A, that is, B may alternatively be determined based on A and/or other information.

In embodiments of this application, "a plurality of" means two or more than two.

In embodiments of this application, descriptions such as "first" and "second" are merely used to indicate and distinguish between described objects, do not indicate a sequence, do not indicate a specific limitation on a quantity of devices in embodiments of this application, and do not constitute any limitation on embodiments of this application.

In embodiments of this application, "connection" means various connection manners such as a direct connection or an indirect connection, to implement communication between devices. This is not limited in embodiments of this application.

In embodiments of this application, unless otherwise specified, "transmission" (or transmit) refers to bidirectional transmission, and includes a sending action and/or a receiving action. Specifically, "transmission" in embodiments of this application includes data sending, data receiving, or data sending and receiving. That is, data transmission herein includes uplink data transmission and/or downlink data transmission. Data may include a channel and/or a signal. The uplink data transmission is uplink channel transmission and/or uplink signal transmission, and the downlink data transmission is downlink channel transmission and/or downlink signal transmission.

In embodiments of this application, a "network" and a "system" express a same concept, and a communication system is a communication network.

It may be understood that, in embodiments of this application, the terminal and/or a base station may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application are necessarily to be performed.

A communication method provided in embodiments of this application may be applied to a communication system shown in FIG. 1. As shown in FIG. 1, a terminal supports dual connectivity (DC), and a master node (MN) and a secondary node (SN) jointly provide a data transmission service for the terminal. The MN is connected to a core network (CN) through an S1/NG interface. The MN has at least a control plane connection to the core network, and may further have a user plane connection to the core network. The S1 interface includes S1-U/NG-U and S1-C/NG-C. The S1-U/NG-U represents the user plane connection, and the S1-C/NG-C represents the control plane connection. The SN may or may not have a user plane connection to the core network. When the SN does not have the user plane connection to the core network, data of the terminal may be offloaded by the MN to the SN at a packet data convergence protocol (PDCP) layer. The MN may also be referred to as a master base station or a master access network device, and the SN may also be referred to as a secondary base station or a secondary access network device.

The communication system in this application may be a long term evolution (LTE) wireless communication system, a 5th generation (5G) mobile communication system such as a new radio (NR) system, another next generation (NG) communication system, or the like. This is not limited in embodiments of this application.

For example, the MN and the SN may each be a base station defined in the LTE 3rd generation partnership project (3GPP). For example, the MN and the SN may each be a base station device in the LTE system, namely, an evolved NodeB (eNB/eNodeB), or may be an access network side device in the NR system, including a gNB, a transmission reception point (transmission/reception point, TRP), and the like.

For example, the MN and the SN may each include a centralized unit (CU) and a distributed unit (DU). Protocol layers of the base station may be separated by using a CU-DU structure, and functions of some protocol layers are controlled by the CU in a centralized manner. Functions of some or all of the remaining protocol layers are distributed in the DU, and the CU controls the DU in the centralized manner. In this way, costs can be reduced and a network is easy to be extended. For example, the MN and the SN may each include one or more CUs and one or more DUs. A specific architecture of the MN and a specific architecture of the SN are not limited in embodiments of this application.

Figure 2A:
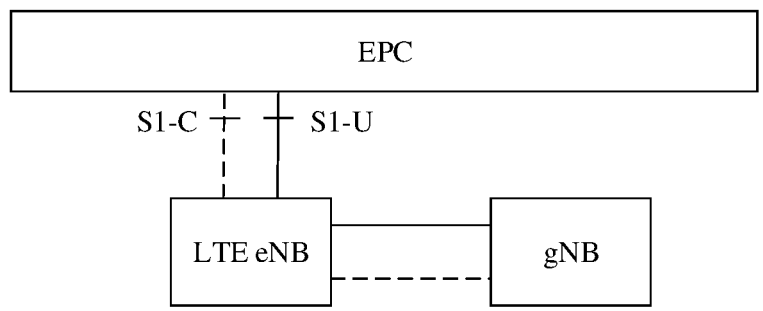
FIG. 2(a) and FIG. 2(b) are a schematic diagram of an architecture of a dual connectivity network according to an embodiment of this application.
Figure 2B:
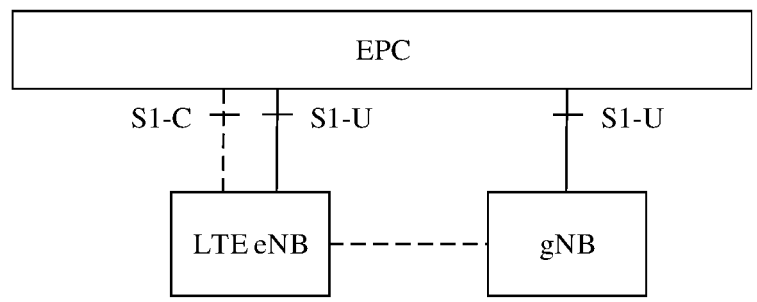

For example, dual connectivity may be implemented between access network devices of different standards. FIG. 2(a) and FIG. 2(b) are a schematic diagram of an LTE-NR dual connectivity (E-UTRA-NR Dual Connectivity, EN-DC) network. The EN-DC network is a dual connectivity between a 4G radio access network and 5G NR. An LTE base station (LTE eNB) serves as an MN, and an NR base station (NR gNB) serves as an SN. There is an X2 interface between the LTE base station and the NR base station. As shown in FIG. 2(a), there is an S1 interface between the LTE eNB and an evolved packet core (EPC) in an LTE system. At least a control plane connection is included, and a user plane connection may be further included. As shown in FIG. 2(b), there is an S1-U interface between the NR gNB and an EPC. That is, only a user plane connection may be included. The LTE base station may provide an air interface resource for UE by using at least one LTE cell. In this case, the at least one LTE cell is referred to as a master cell group (MCG). The NR base station may provide an air interface resource for the UE by using at least one NR cell. In this case, the at least one NR cell is referred to as a secondary cell group (SCG).

Figure 3A:
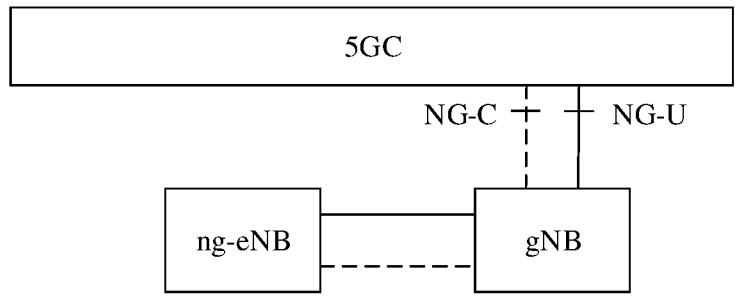
FIG. 3(a) and FIG. 3(b) are a schematic diagram of an architecture of another dual connectivity network according to an embodiment of this application.
Figure 3B:
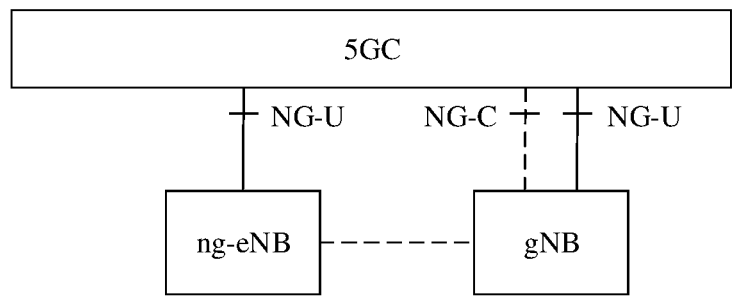

FIG. 3(a) and FIG. 3(b) are a schematic diagram of an NR-LTE dual connectivity (NR-E-UTRA Dual Connectivity, NE-DC) network. The NE-DC network is dual connectivity between a 4G radio access network and 5G NR in a 5G core network. An NR base station (gNB) serves as an MN, an LTE base station (ng-eNB) serves as an SN, and both the MN and the SN are connected to the 5G core network (5th Generation Core Network, 5GC). There is an Xn interface between the NR base station and the LTE base station. As shown in FIG. 3(a), there is an NG interface between the gNB and the 5GC. At least a control plane connection is included, and a user plane connection may be further included. The ng-eNB sends user plane data to the 5GC through the gNB. As shown in FIG. 3(b), there is an NG-U interface between the ng-eNB and the 5GC. Only a user plane connection is established for a terminal. The ng-eNB directly sends user plane data to the 5GC. The NR base station may provide an air interface resource for UE by using at least one NR cell. In this case, the at least one NR cell is referred to as an MCG. The LTE base station may provide an air interface resource for the UE by using at least one LTE cell. In this case, the at least one LTE cell is referred to as an SCG.

Figure 4A:
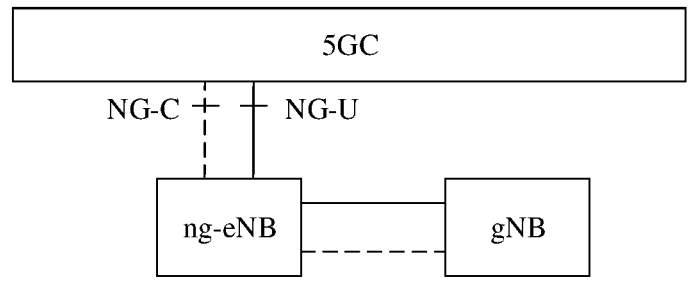
FIG. 4(a) and FIG. 4(b) are a schematic diagram of an architecture of another dual connectivity network according to an embodiment of this application.
Figure 4B:
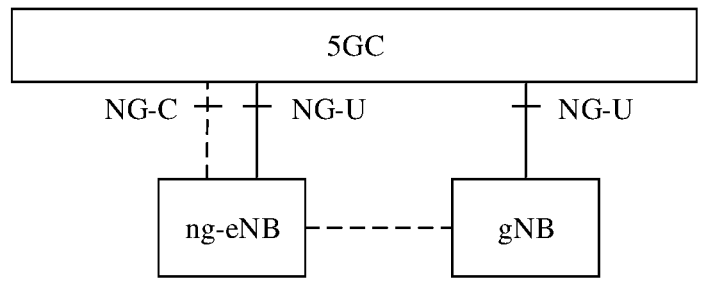

FIG. 4(a) and FIG. 4(b) are a schematic diagram of a next generation E-UTRA-NR dual connectivity (NGEN-DC) network. The NGEN-DC network is dual connectivity between a 4G radio access network and 5G NR in a 5G core network. An LTE base station (ng-eNB) serves as an MN, an NR base station (gNB) serves as an SN, and both the MN and the SN are connected to the 5GC. There is an Xn interface between the LTE base station and the NR base station. As shown in FIG. 4(a), there is an NG interface between the ng-eNB and the 5GC. At least a control plane connection is included, and a user plane connection may be further included. The gNB sends user plane data to the 5GC through the ng-eNB. As shown in FIG. 4(b), there is an NG-U interface between the gNB and the 5GC. Only a user plane connection is established for a terminal. The gNB directly sends user plane data to the 5GC. The LTE base station may provide an air interface resource for UE by using at least one LTE cell. In this case, the at least one LTE cell is referred to as an MCG. The NR base station may provide an air interface resource for the UE by using at least one NR cell. In this case, the at least one NR cell is referred to as an SCG.

Figure 5A:
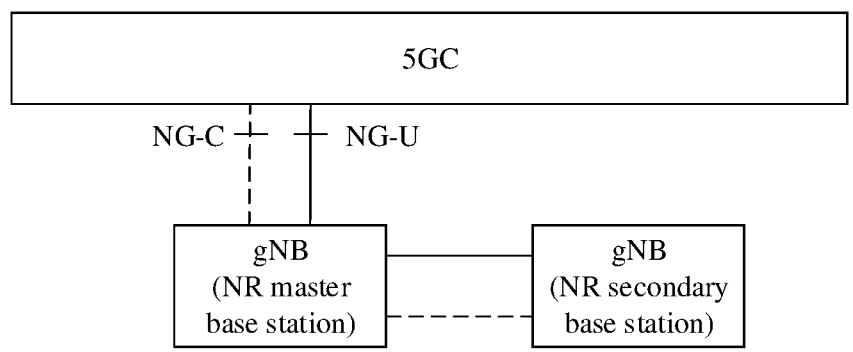
FIG. 5(a) and FIG. 5(b) are a schematic diagram of an architecture of another dual connectivity network according to an embodiment of this application.
Figure 5B:
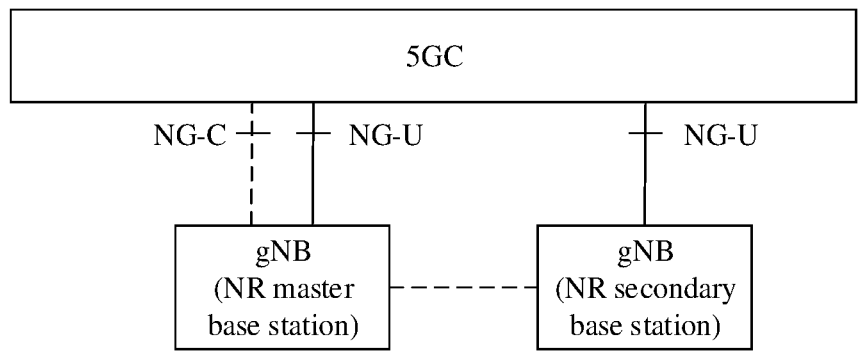

FIG. 5(a) and FIG. 5(b) are a schematic diagram of a 5G core network NR-NR dual connectivity (NR-DC) network. In the NR-DC network, both an MN and an SN are NR base stations, and there is an Xn interface between an NR master base station and an NR secondary base station. As shown in FIG. 5(a), there is an NG interface between the NR master base station and a 5GC. At least a control plane connection is included, and a user plane connection may be further included. As shown in FIG. 5(b), there is an NG-U interface between the NR secondary base station and a 5GC. Only a user plane connection is established for a terminal. The NR master base station may provide an air interface resource for UE by using at least one NR cell. In this case, the at least one NR cell is referred to as an MCG. The NR secondary base station may provide an air interface resource for the UE by using at least one NR cell. In this case, the at least one NR cell is referred to as an SCG.

In the dual connectivity networks in FIG. 2(a) to FIG. 5(b), a user plane connection may alternatively not be established between the SN and the core network, but data is transmitted through the MN. For example, in a downlink direction, data of the terminal arrives at the MN, and then the MN distributes, at a PDCP layer, the data of the terminal to the SN, where a form of the distributed data is, for example, a PDCP protocol data unit (PDU).

It may be understood that the communication method provided in embodiments of this application may be applied to a conventional LTE dual connectivity network (for example, the EN-DC network), or may be applied to a multi-radio dual connectivity (MR-DC) network. The MR-DC network may be an NE-DC network, an NGEN-DC network, or an NR-DC network in a 5G system, or may have another future DC architecture. A specific architecture of the dual connectivity network to which the communication method is applicable is not limited in embodiments of this application. FIG. 2(a) to FIG. 5(b) are merely used as examples for description herein.

In dual connectivity, a data radio bearer (DRB) established between the terminal and an access network side may be independently provided by the MN or the SN, or may be provided by both the MN and the SN. A bearer provided by the MN is referred to as an MCG bearer, where an MCG includes a cell managed by at least one MN configured to provide an air interface resource for the terminal. A bearer provided by the SN is referred to as an SCG bearer, where an SCG includes a cell managed by at least one SN configured to provide an air interface resource for the terminal. In addition, a bearer on which an air interface resource is provided by both the MN and the SN is referred to as a split bearer.

When there is only one cell in the MCG, the cell is a primary cell (PCell) of the terminal. When there is only one cell in the SCG, the cell is a primary secondary cell (PSCell) of the terminal. The PCell and the PSCell may be collectively referred to as a special cell (SpCell). When there are a plurality of cells in the MCG or the SCG, all cells other than the SpCell may be referred to as secondary cells (SCells). In this case, an SCell and a SpCell in each cell group perform carrier aggregation (CA) to jointly provide a transmission resource for the terminal. The PSCell is a cell, in which the UE is indicated to perform random access or initial PUSCH transmission, in cells of the SCG. The SCell is a cell that works on a secondary carrier. Once a radio resource control (RRC) connection is established, the SCell may be configured to provide an additional radio resource.

Figure 6:
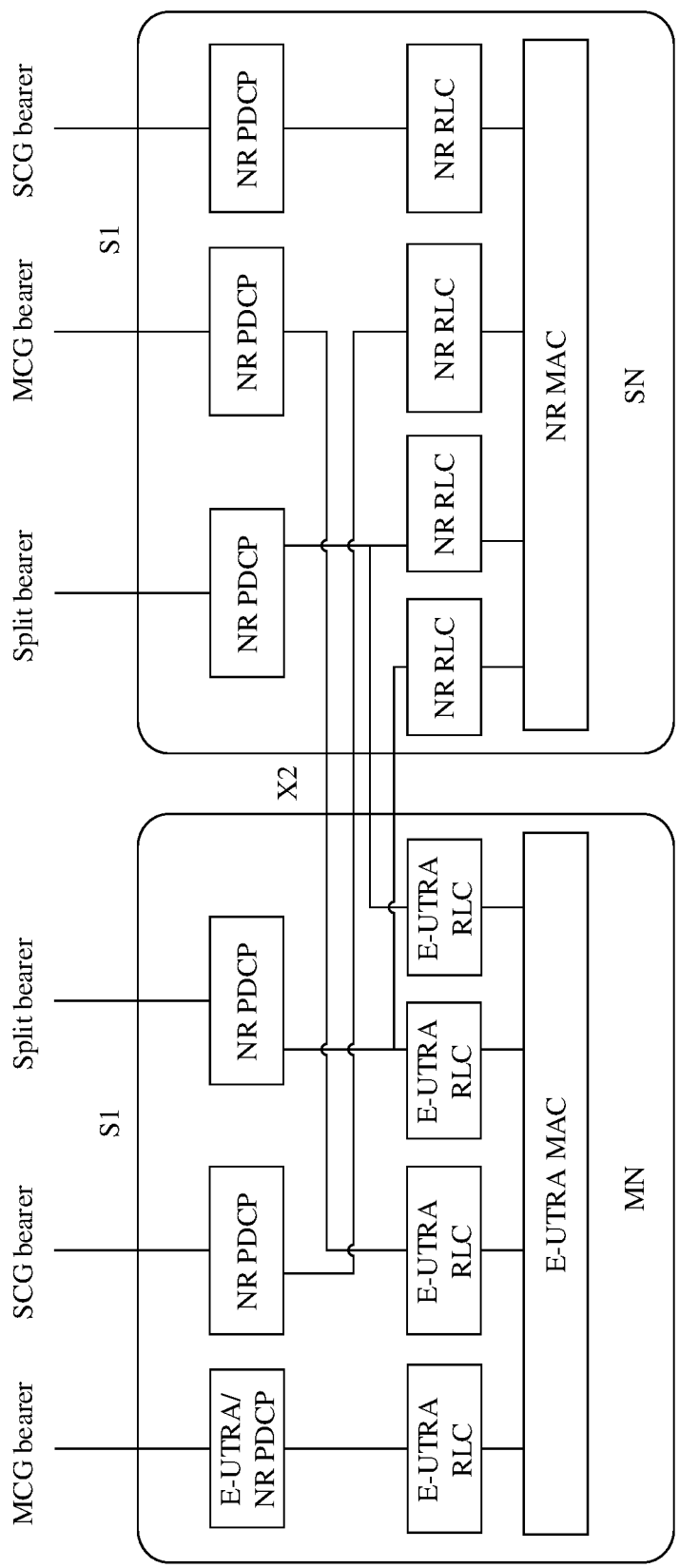
FIG. 6 is a schematic diagram of an architecture of an EN-DC network according to an embodiment of this application.

The following uses the EN-DC network as an example to describe a user plane architecture in the EN-DC network architecture. As shown in FIG. 6, in the EN-DC network, a data plane radio bearer may be independently served by the MN or the SN, or may be served by both the MN and the SN. When a bearer is provided only by the MN, that is, a data flow flows only from a core network to the MN, the bearer is an MCG bearer. When a bearer is provided only by the SN, that is, a data flow flows only from a core network to the SN, the bearer is an SCG bearer. When a bearer is provided by both the MN and the SN, that is, a data flow is offloaded at the MN or the SN, the bearer is a split bearer.

For example, with reference to FIG. 6, each bearer type has corresponding PDCP layer processing and RLC layer processing. An RLC bearer transmitted by using an MCG air interface resource is referred to as an MCG RLC bearer, and an RLC bearer transmitted by using an SCG air interface resource is referred to as an SCG RLC bearer. In FIG. 6, a PDCP entity may be terminated at the MN, or may be terminated at the SN. A bearer whose PDCP is terminated at the MN is referred to as an MN terminated bearer. In other words, downlink data directly arrives at the MN from the core network, and is processed by the PDCP of the MN and then sent to the terminal through the RLC bearer. Similarly, a bearer whose PDCP is terminated at the SN is referred to as an SN terminated bearer. In other words, downlink data directly arrives at the SN from the core network, and is processed by the PDCP of the SN and then sent to the terminal through the RLC bearer.

For example, depending on whether the PDCP entity is established on the MN or the SN, a bearer in DC may be further classified into the following types: an MN terminated MCG bearer, an MN terminated SCG bearer, an MN terminated split bearer, an SN terminated MCG bearer, an SN terminated SCG bearer, and an SN terminated split bearer. For the MN terminated bearer, the PDCP entity is established on the MN, and a user plane connection to the core network is terminated at the MN, that is, the MN is used as an anchor. For the SN terminated bearer, the PDCP entity is established on the SN, and the user plane connection to the core network is terminated at the SN, that is, the SN is used as an anchor. It may be understood that whether a bearer is terminated at the MN or the SN indicates whether data transmission with the core network is performed through the MN or the SN, and an air interface transmission resource is provided by the MCG or the SCG. For example, if the MN terminated SCG bearer is used, downlink data delivered by the core network is processed by a PDCP layer of the MN, and all the downlink data is transferred to an RLC layer and a MAC layer of the SN for further processing and then sent to the terminal through the SCG. Correspondingly, uplink data sent by the terminal is processed by the MAC layer and the RLC layer of the SN, and all the uplink data is transferred to the PDCP layer of the MN for processing and then sent to a core network device through an interface between the MN and the core network. If the MN terminated split bearer is used, after downlink data delivered by the core network is processed by a PDCP layer of the MN, a part of the data is transferred to the SN and then sent to the terminal through the SCG, and the remaining part of the data is still sent by the MN to the terminal through the MCG. Correspondingly, a part of uplink data sent by the terminal is sent to the MN through the MCG, and the other part of the uplink data is sent to the SN through the SCG. The two parts of data are converged at the PDCP layer of the MN for processing, and are sent to a core network device through an interface between the MN and the core network.

In the DC network, a PDCP configuration of the SN terminated bearer is generated by the SN, and the SN may change, based on an implementation, the PDCP configuration of the SN terminated bearer for the terminal. Therefore, the MN does not have the latest configuration generated by the SN for the terminal. During inter-base-station handover, to enable a target base station (for example, a target MN or a target SN) to generate an incremental configuration for the terminal, before initiating the handover, a source MN may request the latest configuration from a source SN by using a modification procedure, and then trigger the handover. However, because a modification procedure between a master base station and a secondary base station needs to be triggered before a handover procedure is performed, excessively long time is required for an entire handover process, resulting in handover performance deterioration. To avoid handover performance deterioration caused by first triggering the modification procedure, the modification procedure may not be performed before the handover procedure. To be specific, the source MN does not obtain a configuration carried on a source SN side, and the target base station does not receive the configuration carried on the source SN side. Therefore, the target base station provides a full PDCP configuration for the UE instead of performing incremental configuration. However, in the full PDCP configuration, some information elements (for example, an uplink PDCP sequence number length and a downlink PDCP sequence number length) are allowed to be configured for the UE only when a data radio bearer (DRB) is established. In this case, the target base station considers that the DRB is initially established, but a DRB on a UE side has been established. Consequently, a configuration on the UE side is inconsistent with a configuration on a target base station side, and the UE considers that the configuration fails. As a result, services of the UE are interrupted, and user experience is affected.

To resolve a problem that the services of the UE are interrupted, and user experience is affected because the configuration on the UE side is inconsistent with the configuration on a network side when the modification procedure is not performed before the handover procedure is triggered, embodiments of this application provide a communication method. This avoids configuration inconsistency between the UE side and the network side, avoid service interruption of the UE, and improves user experience.

Figure 7:
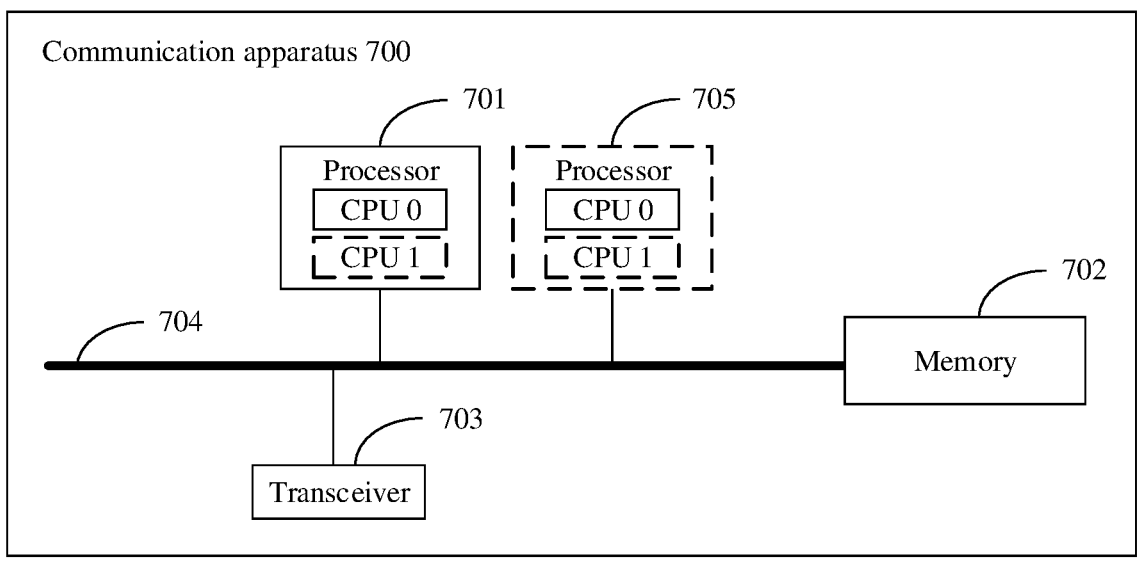
FIG. 7 is a schematic diagram of a structure of a communication apparatus according to an embodiment of this application.

In a specific implementation, in the communication method provided in embodiments of this application, the terminal shown in FIG. 1 may use a composition structure shown in FIG. 7, or include a component shown in FIG. 7.

For example, FIG. 7 is a schematic diagram of a component of a communication apparatus 700 according to an embodiment of this application. As shown in FIG. 7, the communication apparatus 700 may include at least one processor 701, a memory 702, a transceiver 703, and a communication bus 704.

The following describes each component of the communication apparatus 700 in detail with reference to FIG. 7.

The processor 701 is a control center of the communication apparatus 700, and may be one processor, or may be a collective term of a plurality of processing elements. For example, the processor 701 is a central processing unit (CPU) or an application-specific integrated circuit (ASIC), or is configured as one or more integrated circuits implementing embodiments of the present invention, for example, one or more microprocessors (DSPs) or one or more field programmable gate arrays (FPGAs).

The processor 701 may run or execute a software program stored in the memory 702, and invoke data stored in the memory 702, to perform various functions of a communication device.

In an embodiment, the processor 701 may include one or more CPUs, such as a CPU 0 and a CPU 1 shown in FIG. 7.

In an embodiment, the communication apparatus 700 may include a plurality of processors, such as a processor 701 and a processor 705 shown in FIG. 7. Each of the processors may be a single-core processor (single-CPU), or may be a multi-core processor (multi-CPU). The processor herein may refer to one or more communication devices, circuits, and/or processing cores configured to process data (for example, computer program instructions).

The memory 702 may be a read-only memory (ROM), another type of static storage communication device capable of storing static information and instructions, a random access memory (RAM), or another type of dynamic storage communication device capable of storing information and instructions, or may be an electrically erasable programmable read-only memory (EEPROM), a compact disc read-only memory (CD-ROM), another compact disc storage, an optical disc storage (including a compressed optical disc, a laser disc, an optical disc, a digital versatile disc, a Blu-ray optical disc, and the like), a magnetic disk storage medium, another magnetic storage communication device, or any other medium capable of carrying or storing expected program code in a form of instructions or data structures and capable of being accessed by a computer, but is not limited thereto. The memory 702 may exist independently, and is connected to the processor 701 by using the communication bus 704. The memory 702 may alternatively be integrated with the processor 701.

The memory 702 is configured to store a software program for executing the solutions of the present invention, and the processor 701 controls the execution.

The transceiver 703 is configured to communicate with an access network device. Certainly, the transceiver 703 may alternatively be configured to communicate with a communication network. The communication network is, for example, the Ethernet, a radio access network (RAN), or a wireless local area network (WLAN). The transceiver 703 may include a receiving unit for implementing a receiving function and a sending unit for implementing a sending function.

The communication bus 704 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 7, but this does not mean that there is only one bus or only one type of bus.

It should be noted that the communication apparatus 700 may be a desktop computer, a portable computer, a mobile phone, a tablet computer, a wireless terminal, an embedded device, a chip system, or a device having a structure similar to that in FIG. 7. In addition, a composition structure shown in FIG. 7 does not constitute a limitation on the communication apparatus. In addition to the components shown in FIG. 7, the communication apparatus may include more or fewer components than those shown in the figure, or some components may be combined, or different component arrangements may be used.

With reference to FIG. 1 to FIG. 7, FIG. 8 shows a communication method according to an embodiment of this application. The method may include the following steps.

S801: A source access network device sends at least one identifier of at least one first DRB to a target access network device.

The source access network device does not obtain a PDCP configuration of the first DRB.

For example, the at least one identifier (for example, first DRB ID) of the at least one first DRB may be carried in a handover request message. Optionally, the at least one identifier of the at least one first DRB may be sent in a form of a list. For example, the handover request message carries a first DRB ID list, and the first DRB ID list includes the ID of the at least one first DRB.

Optionally, in step S801, the source access network device may further send the PDCP configuration of the at least one first DRB to the target access network device, and indicate, to the target access network device, that the PDCP configuration of the at least one first DRB is not the latest configuration. For example, the source access network device may further send the PDCP configuration of the at least one first DRB to the target access network device, and indicate that the PDCP configuration of the at least one first DRB is an initial configuration. It may be understood that, when the source access network device is a source MN, because the source MN has an initial configuration of a DRB established on a source SN, and the source SN may change the configuration during implementation, the source MN does not have the latest configuration generated by the source SN for a terminal. Therefore, the source MN may send the initial configuration and an indication to the target access network device, to indicate that the configuration is the initial configuration. In this implementation, the PDCP configuration sent by the source access network device to the target access network device carries the at least one identifier of the at least one first DRB.

For example, the source access network device is an access network device connected to the terminal before inter-base-station handover. Before the inter-base-station handover, the terminal may work in a single connectivity mode, or may work in a dual connectivity mode. A specific working mode of the terminal is not limited in this embodiment. In the following embodiment, only an example in which the terminal works in the dual connectivity mode before the inter-base-station handover is used for description. For example, before the inter-base-station handover, the terminal works in the dual connectivity communication mode, and the source access network device is the source MN of the terminal during dual connectivity communication.

For example, a first DRB may be the DRB established on the source SN. Correspondingly, the source MN does not obtain the PDCP configuration of the first DRB established on the source SN.

For example, that the source MN does not obtain the PDCP configuration of the first DRB established on the source SN may be that the source MN does not initiate an SN modification procedure before sending the handover request message, that is, the source MN does not obtain, from the source SN, a source configuration currently generated by the source SN for UE. Therefore, the source MN does not obtain the PDCP configuration of the first DRB established on the source SN. It may be understood that the source MN may obtain, from the source SN by initiating the SN modification procedure, the source configuration of the DRB on the source SN. However, if the SN modification procedure is initiated before a handover procedure is performed, excessively long time is required for an entire handover process, resulting in handover performance deterioration. Therefore, in this embodiment, the source MN does not initiate the SN modification procedure before performing the handover procedure. In this case, the source MN does not obtain the PDCP configuration of the DRB established on the source SN.

For example, that the source access network device does not obtain a PDCP configuration of the first DRB may be considered as follows: When the source MN does not obtain the PDCP configuration of the first DRB established on the source SN, the source MN does not send the PDCP configuration of the first DRB to the target access network device.

For example, when the source MN obtains the PDCP configuration of the at least one first DRB established on the source SN, the source MN sends, to the target access network device, the PDCP configuration of the at least one first DRB established on the source SN; or when the source MN does not obtain the PDCP configuration of the at least one first DRB established on the source SN, the source MN sends the at least one identifier of the at least one first DRB to the target access network device. That is, when the source MN sends the at least one identifier of the at least one first DRB to the target access network device, the source MN does not obtain the PDCP configuration of the at least one first DRB. In other words, the source MN carries the at least one identifier of the at least one first DRB only when the source MN does not carry the PDCP configuration of the DRB established on the source SN.

For example, the at least one identifier that is of the at least one first DRB and that is sent by the source MN to the target access network device may be determined by the source MN, or may be sent by the source SN to the source MN.

For example, in an EN-DC network, one DRB may be established for one E-UTRAN radio access bearer (E-RAB). A mapping relationship between an E-RAB and a DRB ID is determined by the source MN. Therefore, the source MN may send, to the target access network device, the ID of the at least one first DRB established on the source SN, and one first DRB corresponds to one E-RAB.

For another example, in an MR-DC network, the source MN may allocate a range of DRB IDs to the source SN, and the source MN does not know specific DRB IDs used by the source SN. In this case, in an implementation, the source MN sends, to the target access network device, all DRB IDs allocated by the source MN to the source SN. In other words, the at least one identifier of the at least one first DRB is all the DRB identifiers allocated by the source MN to the source SN. In another implementation, before step S801, the source MN may receive the at least one identifier that is of the at least one first DRB and that is sent by the source SN, and then send, to the target access network device by performing step S801, the at least one identifier that is of the at least one DRB and that is sent by the source SN.

S802: The target access network device receives the at least one identifier of the at least one first DRB.

For example, the target access network device receives the handover request message sent by the source access network device, where the handover request message includes the at least one identifier of the at least one first DRB.

For example, the target access network device receives the at least one identifier of the at least one first DRB, and may determine that the at least one first DRB is the DRB established on the source SN. In addition, the target access network device does not have the PDCP configuration of the first DRB.

Optionally, in step S801, the source access network device may further send the PDCP configuration of the at least one first DRB to the target access network device, and indicate, to the target access network device, that the PDCP configuration of the at least one first DRB is not the latest configuration. In this case, in step S802, the target access network device may determine that the target access network device does not obtain the latest configuration of the at least one first DRB.

S803: The target access network device obtains configuration information.

The configuration information includes first indication information, and the first indication information is used to indicate the terminal to release at least one PDCP entity of the at least one first DRB. To be specific, the target access network device may indicate the terminal to release the at least one PDCP entity of the at least one first DRB established on the source SN, so that the terminal releases a configuration that is unknown to the target access network device. This avoids service interruption of the terminal caused by configuration inconsistency between a terminal side and a target access network device side.

For example, the first indication information may be a list, for example, drb-ToReleaseList. The drb-ToReleaseList may include the at least one identifier of the at least one first DRB, and is used to indicate the terminal to release at least one PDCP entity that is of the at least one first DRB and that is indicated by the list.

Optionally, the configuration information further includes second indication information, and the second indication information is used to indicate the terminal to add at least one PDCP configuration of at least one second DRB. For example, the second indication information may also be a list, for example, drb-ToAddmodList. The drb-ToAddmodList may include an identifier of the at least one second DRB and a PDCP configuration that corresponds to an identifier of each second DRB, and is used to indicate the terminal to add the PDCP configuration that is of the at least one second DRB and that is indicated by the list.

For example, the identifier of the at least one second DRB may be the same as or different from the identifier of the at least one first DRB. For example, that the identifier of the at least one second DRB is the same as the identifier of the at least one first DRB means that the identifier of the at least one second DRB is completely the same as the identifier of the at least one first DRB; and that the identifier of the at least one second DRB is different from the identifier of the at least one first DRB means that the identifier of the at least one second DRB may be partially the same as or completely different from the identifier of the at least one first DRB.

For example, the identifier of the at least one first DRB may be a DRB 1, a DRB 2, and a DRB 3, and the identifier of the at least one second DRB may also be the DRB 1, the DRB 2, and the DRB 3; or the identifier of the at least one second DRB may be the DRB 1, the DRB 2, and a DRB 4; or the identifier of the at least one second DRB may be a DRB 4, a DRB 5, and a DRB 6.

For example, the at least one first DRB and the at least one second DRB correspond to a same E-RAB. It may be understood that, when a first DRB is released, a second DRB may be correspondingly added, and the first DRB and the second DRB that corresponds to the first DRB correspond to a same E-RAB. An identifier of the first DRB may be the same as or different from an identifier of the second DRB that corresponds to the first DRB.

For example, when the identifier of the at least one first DRB is the DRB 1, the DRB 2, and the DRB 3, and the identifier of the at least one second DRB is the DRB 1, the DRB 2, and the DRB 4, the identifiers DRB 1, DRB 2, and DRB 3 of the at least one first DRB respectively correspond to an E-RAB 1, an E-RAB 2, and an E-RAB 3, and the identifiers DRB 1, DRB 2, and DRB 4 of the at least one second DRB also respectively correspond to the E-RAB 1, the E-RAB 2, and the E-RAB 3. To be specific, when a first DRB corresponding to an E-RAB is released, a new second DRB is established for the E-RAB. An identifier of the released first DRB may be the same as or different from an identifier of the newly established second DRB, but the released first DRB and the newly established second DRB correspond to a same E-RAB, or may be mapped to a same E-RAB based on the identifier of the released first DRB and the identifier of the newly established second DRB.

For example, when the configuration information includes both the first indication information and the second indication information, because one first DRB corresponds to one second DRB, the target access network device may enable the terminal to release the source configuration of the first DRB and then add the new configuration of the second DRB corresponding to the first DRB.

For example, the target access network device may or may not configure DC for the terminal. In a scenario in which the target access network device configures the DC for the terminal, the target access network device in step S803 is a target MN. In a scenario in which the target access network device does not configure the DC for the terminal, the target access network device in step S803 is a target base station, that is, there is single connectivity between the terminal and the target base station.

For example, in the scenario in which the target access network device configures the DC for the terminal, that the target access network device obtains configuration information may include: The target MN determines the first indication information, and receives the second indication information sent by a target SN. Alternatively, the target MN receives the configuration information sent by a target SN. Alternatively, both the target MN and a target SN determine the configuration information. In the scenario in which the target access network device does not configure the DC for the terminal, that that the target access network device obtains configuration information may include: The target base station determines the configuration information.

For example, when the target MN configures the DC for the terminal, the second indication information may be determined by the target MN, or may be determined by the target SN, or may be determined by both the target MN and the target SN. For example, the target MN may configure a PDCP configuration of some of the at least one second DRB for the terminal, and the target SN may configure a PDCP configuration of the other of the at least one second DRB for the terminal. For another example, the target SN may configure the PDCP configuration of at least one second DRB for the terminal, and send the one or more PDCP configurations of the at least one second DRB to the target MN. In a scenario in which the target MN configures the DC for the terminal, a specific configuration manner of the at least one second DRB is not limited in this embodiment.

S804: The target access network device sends the configuration information to the source access network device.

For example, the configuration information may be carried in a handover request acknowledgment message.

For example, the target access network device may send, to the source MN, the handover request acknowledgment message that carries the configuration information.

S805: The source access network device receives the configuration information.

For example, the source MN receives the handover request acknowledgment message, and obtains the configuration information sent by the target access network device.

S806: The source access network device sends the configuration information to the terminal.

Optionally, the configuration information may be carried in an RRC reconfiguration message.

S807: The terminal receives the configuration information from the source access network device.

For example, the terminal receives the RRC reconfiguration message, and obtains the configuration information sent by the source MN.

S808: The terminal releases the at least one PDCP entity of the at least one first DRB based on the configuration information.

For example, the terminal may release the at least one PDCP entity of the at least one first DRB based on the first indication information in the configuration information. That is, the terminal may release the at least one PDCP entity of the at least one first DRB established on the source SN. In other words, the terminal releases at least one PDCP entity that is established on the source SN and that is unknown to the target access network device. This avoids the service interruption of the terminal caused by the configuration inconsistency between the terminal side and the target access network device side.

When the configuration information includes the second indication information, step S808 further includes: The terminal adds the at least one PDCP configuration of the at least one second DRB based on the second indication information. To be specific, after releasing the at least one PDCP entity of the at least one first DRB established on the source SN, the terminal may add the PDCP configuration that is of the at least one second DRB and that is configured by the target base station for the terminal, so that a radio bearer configuration on the terminal side is consistent with a radio bearer configuration on a target base station side.

In this embodiment, the source MN sends the identifier of the at least one first DRB to the target access network device, where the source MN does not obtain the PDCP configuration of the at least one first DRB. After receiving the identifier of the at least one first DRB, the target access network device indicates the terminal to release the at least one PDCP entity of the at least one first DRB, so that the terminal releases at least one PDCP entity that is established on the source SN and that is unknown to the target access network device. This avoids the service interruption of the terminal caused by radio bearer configuration inconsistency between the terminal side and the target access network device side.

An embodiment of this application further provides a communication method. As shown in FIG. 9, in the scenario in which the target access network device configures the DC for the terminal, the target access network device in FIG. 8 (which illustrates steps S801 to S808) is the target MN in FIG. 9. After step S802 and before step S803, the method in FIG. 9 may further include S809 to S813.

S809: The target MN sends one or more identifiers of some or all of the first DRBs to a target SN.

For example, the identifier of the some or all of the at least one first DRB may be carried in an SN addition request message. Optionally, the identifier of the some or all of the at least one first DRB may be sent in a form of a list. For example, the SN addition request message carries a second DRB ID list, and the second DRB ID list includes the ID of the some or all of the at least one first DRB.

For example, when the target MN configures the DC for the terminal, the target MN may send the identifier of the some or all of the at least one first DRB to the target SN.

For example, the identifier of the at least one first DRB in step S801 include a DRB 1, a DRB 2, and a DRB 3. In step S809, the target MN may send one or more DRB IDs in the DRB 1, the DRB 2, and the DRB 3 to the target SN. For example, the target MN may send the DRB 1 and the DRB 2 to the target SN. For another example, the target MN may send the DRB 1, the DRB 2, and the DRB 3 to the target SN.

S810: The target SN receives the identifier of the some or all of the at least one first DRB.

S811: The target SN determines a third indication.

For example, when the target SN receives the identifier that is of the some of the at least one first DRB and that is sent by the target MN, the target SN determines the third indication, where the third indication is used to indicate the terminal to release a PDCP entity of the some of the first DRBs. In this implementation, the target MN in step S803 determines a fourth indication, where the fourth indication is used to indicate the terminal to release a DRB other than the some of the at least one first DRB. That is, the first indication information in step S803 includes the third indication and the fourth indication.

For example, in step S801, the identifier of the at least one first DRB includes the DRB 1, the DRB 2, and the DRB 3, and the target SN receives the DRB 1 and the DRB 2 sent by the target MN. The target SN may determine the third indication, where the third indication is used to indicate the terminal to release PDCP entities of the DRB 1 and the DRB 2. In other words, the first indication information in step S803 may be determined by both the target MN and the target SN.

For example, when the target SN receives the identifier that is of all the first DRBs and that is sent by the target MN, the target SN determines the third indication, where the third indication is used to indicate the terminal to release at least one PDCP entity of the at least one first DRB.

For example, in step S801, the identifier of the at least one first DRB includes the DRB 1, the DRB 2, and the DRB 3, and the target SN receives the DRB 1, the DRB 2, and the DRB 3 sent by the target MN. The target SN may determine the third indication, where the third indication is used to indicate the terminal to release PDCP entities of the DRB 1, the DRB 2, and the DRB 3. In other words, the first indication information in step S803 may be determined by the target SN.

Optionally, in step S809, when sending the identifier of the some or all of the first DRBs to the target SN, the target MN may further send, to the target SN, an identifier of an E-RAB corresponding to the some or all of the first DRBs. In step S810, the target SN receives the identifier of the some or all of the first DRBs and the identifier of the E-RAB corresponding to the identifier of the some or all of the first DRBs. Therefore, in step S811, the target SN may further determine an indication used to indicate the terminal to add a PDCP configuration of a second DRB. In this implementation, when generating the new PDCP configuration for the second DRB corresponding to the some or all of the first DRBs, the target SN may generate a release configuration for the some or all of the first DRBs. Therefore, after receiving the configuration generated by the target SN for the terminal, the terminal releases the PDCP entity of the first DRB, and then adds the new configuration of the second DRB.

S812: The target SN sends the third indication to the target MN.

The third indication may be carried in an SN addition request acknowledgment message.

S813: The target MN receives the third indication.

For example, the target MN receives, from the target SN, the SN addition request acknowledgment message that carries the third indication.

It may be understood that, when the third indication is used to indicate the terminal to release the PDCP entity of the some of the first DRBs, the first indication information obtained by the target access network device in step S803 includes both the third indication sent by the target SN and the fourth indication determined by the target MN. When the third indication is used to indicate the terminal to release the at least one PDCP entity of the at least one first DRB, that the target access network device obtains the first indication information in the configuration information in step S803 includes: The target MN receives the third indication sent by the target SN, and the target MN determines the fourth indication.

In this embodiment, the source MN sends the identifier of the some or all of the first DRBs to the target SN. After receiving the identifier of the some or all of the first DRBs, the target SN generates the third indication and sends the third indication to the target MN. The target MN receives the third indication sent by the target SN, to indicate the terminal to release the at least one PDCP entity of the at least one first DRB, so that the terminal releases at least one PDCP entity that is established on the source SN and that is unknown to the target access network device. This avoids service interruption of the terminal caused by radio bearer configuration inconsistency between a terminal side and a target access network device side.

Figure 10:
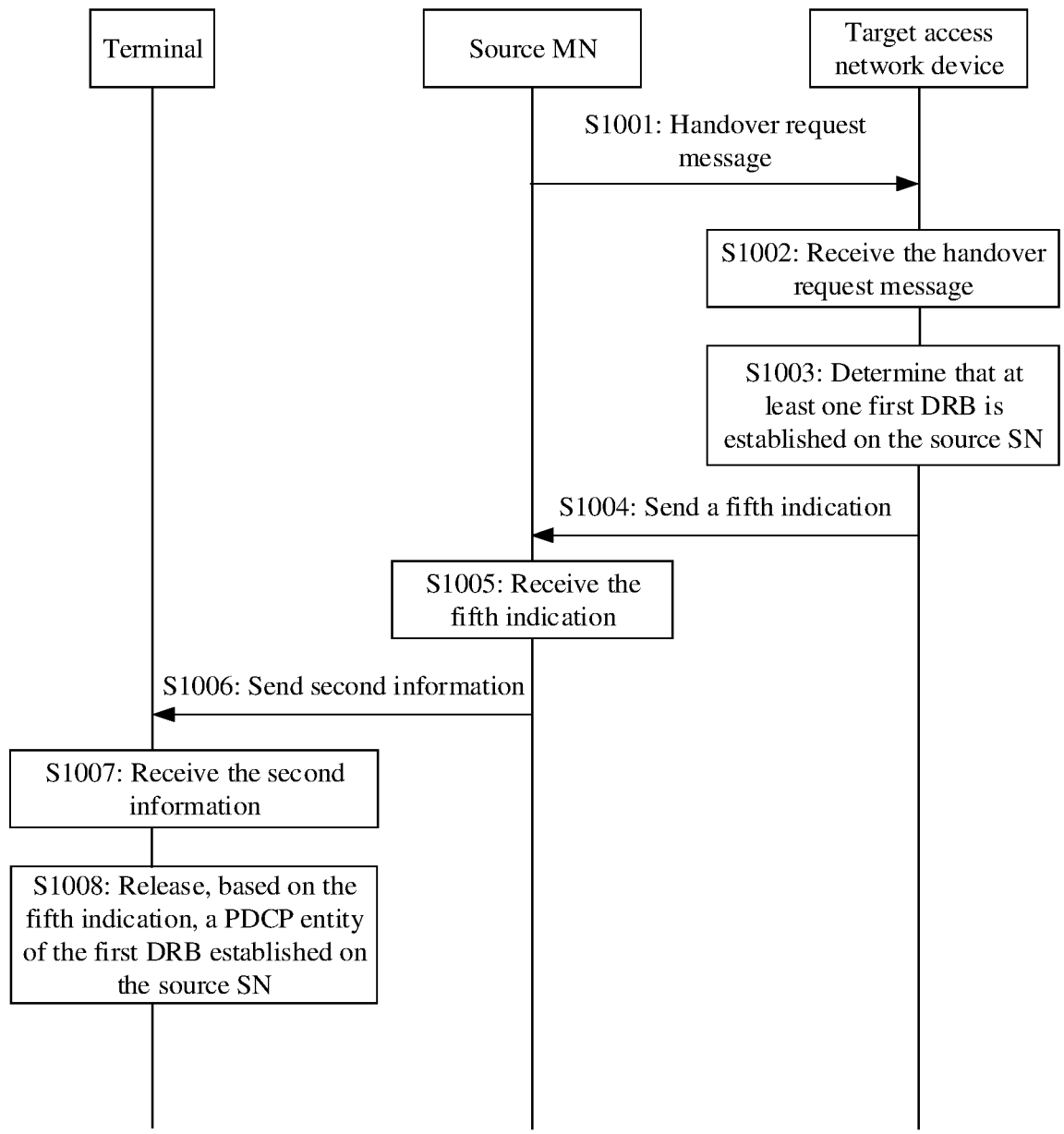
FIG. 10 is a schematic flowchart of another communication method according to an embodiment of this application.

An embodiment of this application further provides a communication method. As shown in FIG. 10, before inter-base-station handover, a terminal works in a dual connectivity mode, and the terminal may transmit data through both a source MN and a source SN. The method includes S1001 to S1008.

S1001: The source MN sends a handover request message to a target access network device.

The source MN does not obtain a PDCP configuration of at least one first DRB.

Optionally, the handover request message carries first information, and the first information is used to indicate that the at least one first DRB is established on the source SN.

For example, the first information may be one-bit indication information, to indicate that the at least one first DRB is established on the source SN.

For example, the first information may alternatively be an ID of at least one first DRB. To be specific, the source MN may send the ID of the at least one first DRB to the target access network device, to notify the target access network device that a DRB is established on the source SN, and the target access network device does not obtain a configuration of the DRB established on the source SN.

S1002: The target access network device receives the handover request message.

S1003: The target access network device determines that the at least one first DRB is established on the source SN.

For example, when the handover request message does not carry the first information, the target access network device in step S1003 may determine whether there is a DRB established on the source SN, but the handover request message does not carry a PDCP configuration of the DRB. Specifically, the target access network device may determine, by comparing an E-RAB ID in the handover request message with a source configuration carried in the handover request message, that the at least one first DRB is established on the source SN. It should be noted that, because an E-RAB is in a one-to-one correspondence with a DRB, the target access network device may determine, based on a correspondence between an E-RAB and a DRB, that the at least one first DRB is established on the source SN.

For example, the source master node (MN) sends the handover request message to the target access network device, where the handover request message carries three E-RAB IDs: an E-RAB 1, an E-RAB 2, and an E-RAB 3, and carries DRB configurations corresponding to two E-RAB IDs, which are respectively a configuration of the DRB 1 and a configuration of the DRB 2. In this case, the target access network device may determine that another DRB is established on a source base station side, but a source configuration of the DRB is not carried. Therefore, the target access network device may determine that one first DRB is established on the source SN.

For example, when the handover request message carries the first information, the target access network device in step S1003 may determine, based on the first information, that the at least one first DRB is established on the source SN. For example, when the first information is a one-bit indication, the target access network device may determine, based on the indication, that the at least one first DRB is established on the source SN. For another example, when the first information is the ID of the at least one first DRB, the target access network device may determine that the at least one first DRB is established on the source SN.

A specific determining method in which the target access network device determines that the at least one first DRB is established on the source SN is not limited in this embodiment, and is merely an example for description herein.

S1004: The target access network device sends a fifth indication to the source MN, where the fifth indication is used to indicate the terminal to release a PDCP entity of the DRB established on the source SN.

For example, after determining that the at least one first DRB is established on the source SN, the target access network device may indicate the terminal to release the PDCP entity of the DRB established on the source SN.

For example, the fifth indication may be carried in a handover request acknowledgment message. For example, the handover request acknowledgment message may further carry a full PDCP configuration configured by the target access network device for the terminal. The full PDCP configuration includes a full configuration that is configured by the target access network device and that is used to transmit data between the terminal and a network device.

For example, the target access network device determines not to configure DC for the terminal. In this case, the target access network device may configure the full PDCP configuration for the terminal. The handover request acknowledgment message may further carry the full PDCP configuration configured by the target access network device for the terminal. For another example, the target access network device determines to configure DC for the terminal. In this case, when the target access network device is a target MN of the terminal during dual connectivity communication, the handover request acknowledgment message may further carry the full PDCP configuration configured by the target MN and/or a target SN for the terminal.

Figure 8:
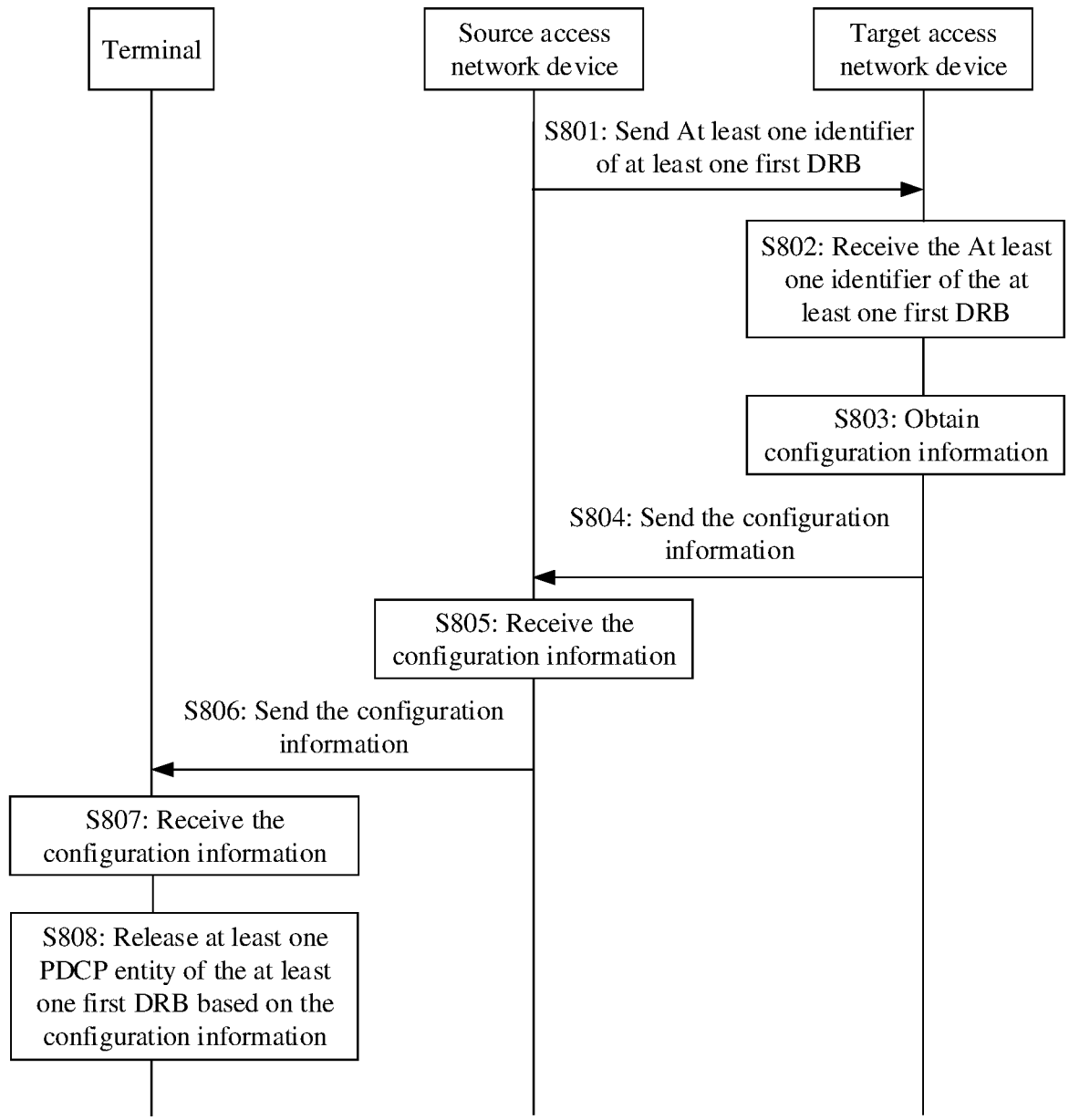
FIG. 8 is a schematic flowchart of a communication method according to an embodiment of this application.
Figure 9:
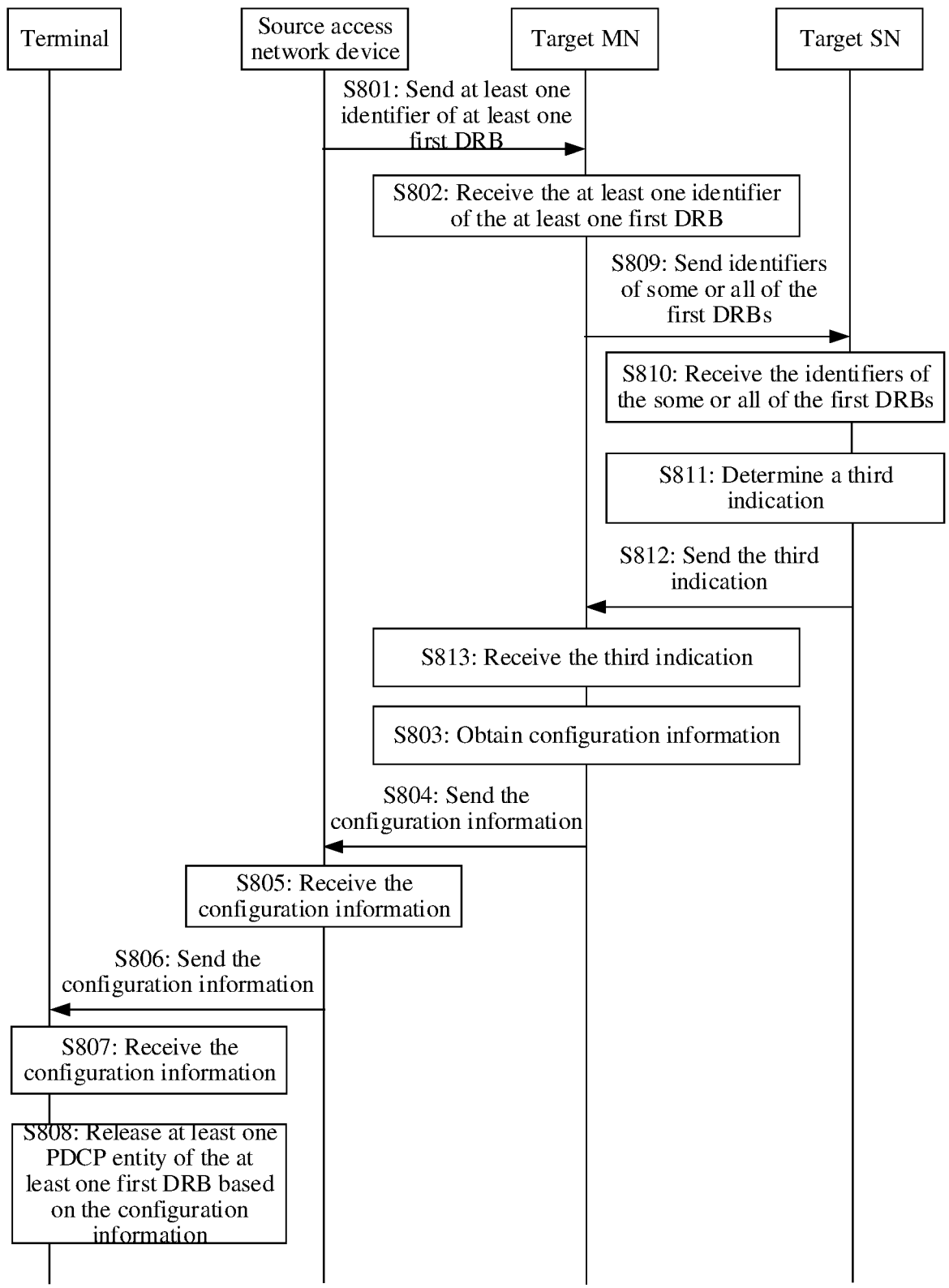
FIG. 9 is a schematic flowchart of another communication method according to an embodiment of this application.

It may be understood that, in the embodiment shown in FIG. 8 or FIG. 9, when indicating the terminal to release the source configuration, the target access network device notifies the terminal of a specific DRB whose configuration is to be released. Different from the embodiment shown in FIG. 8 or FIG. 9, in this embodiment, when indicating the terminal to release the source configuration, the target access network device does not notify the terminal of a specific DRB whose configuration is to be released, but only indicates the terminal to release a PDCP configuration of a DRB established on the source SN. Therefore, in this embodiment, the terminal identifies a DRB established on the source SN, and then releases the PDCP configuration of the identified DRB established on the source SN.

Optionally, the fifth indication sent by the target access network device to the source MN in step S1004 may further indicate the terminal to release the PDCP entity of the at least one DRB. The fifth indication may be drb-ToReleaseList. The drb-ToReleaseList includes the identifier of the at least one DRB, and is used to indicate the terminal to release at least one PDCP entity that is of the at least one DRB and that is indicated by the Drb-ToReleaseList. The at least one identifier of the at least one DRB is all DRB identifiers other than the DRB identifier in the source configuration sent by the source MN to the target access network device. For example, a maximum value of a DRB identifier is N. The handover request message sent by the source MN to the target access network device carries the source configuration, and the source configuration includes a PDCP source configuration of the DRB 1. Therefore, the target access network device may determine, based on the source configuration, that values of DRB identifiers included in the drb-ToReleaseList are 2 to N.

S1005: The source MN receives the fifth indication.

For example, the source MN may receive the handover request acknowledgment message from the target access network device, to obtain the fifth indication.

For example, when the handover request acknowledgment message includes the full PDCP configuration configured by the target access network device (the target MN and/or the target SN) for the terminal, the source MN may obtain the full PDCP configuration.

S1006: The source MN sends second information to the terminal, where the second information includes the fifth indication.

For example, the second information may further include the full PDCP configuration configured by the target MN and/or the target SN for the terminal.

For example, the second information may be included in one message, or may be included in a plurality of messages. This is not limited in this embodiment. For example, the fifth indication and the full PDCP configuration may be included in an RRC reconfiguration message. For another example, the fifth indication and the full PDCP configuration may alternatively be included in different messages.

S1007: The terminal receives the second information.

For example, the terminal receives the RRC reconfiguration message from the source MN, to obtain the fifth indication.

For example, the second information further includes the full PDCP configuration configured by the target MN and/or the target SN for the terminal, the terminal may receive the RRC reconfiguration message from the source MN, to obtain the full PDCP configuration.

S1008: The terminal releases, based on the fifth indication, the PDCP entity of the first DRB established on the source SN.

For example, that the terminal releases, based on the fifth indication, the PDCP entity of the first DRB established on the source SN includes: The terminal identifies, based on the fifth indication, the DRB established on the source SN; and releases the PDCP entity of the identified DRB established on the source SN.

It may be understood that, after receiving the fifth indication, the terminal may identify, based on the fifth indication, a DRB established on the source SN, and then release a PDCP entity of the identified DRB established on the source SN. In other words, the terminal releases at least one PDCP entity that is established on the source SN and that is unknown to the target access network device. This avoids service interruption of the terminal caused by radio bearer configuration inconsistency between a terminal side and a target access network device side.

Optionally, after releasing the PDCP entity of the DRB established on the source SN, the terminal may further add, on the terminal side based on the full PDCP configuration in the second information, the full PDCP configuration allocated by the target access network device to the terminal. In this way, a configuration on the terminal side is consistent with a configuration on the target access network device side, to ensure service continuity of the terminal and improve user experience.

Figure 11:
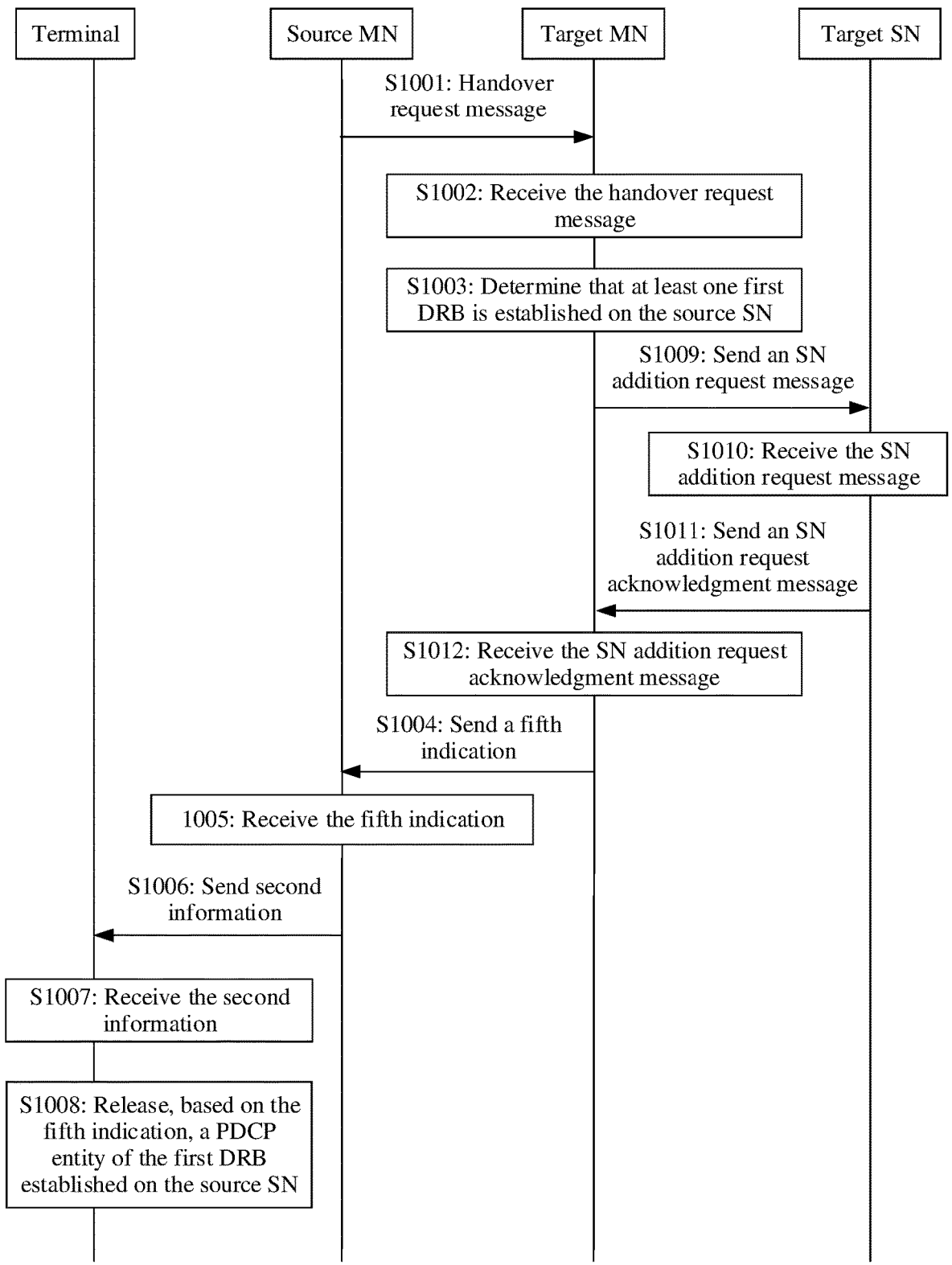
FIG. 11 is a schematic flowchart of another communication method according to an embodiment of this application.

This application further provides an embodiment. As shown in FIG. 11, in the scenario in which the target access network device configures the DC for the terminal, the target access network device in FIG. 10 (which illustrates steps S1001 to S1008) is the target MN in FIG. 11. After step S1003 and before step S1004, the method in FIG. 11 may further include S1009 to S1012.

S1009: The target MN sends an SN addition request message to a target SN.

The SN addition request message is used to request the target SN to allocate a radio resource to the terminal.

S1010: The target SN receives the SN addition request message.

S1011: The target SN sends an SN addition request acknowledgment message to the target MN.

For example, when the target SN can accept a resource request sent by the target MN, the target SN sends the SN addition request acknowledgment message to the target MN.

For example, the SN addition request acknowledgment message may include a PDCP configuration that is of at least one second DRB and that is configured by the target SN for the terminal. An identifier of the at least one second DRB may be the same as or different from an identifier of the at least one first DRB. This is not limited in the embodiments of this application.

For example, the at least one second DRB and the at least one first DRB correspond to a same E-RAB. For details, refer to related descriptions in step S803.

S1012: The target MN receives the SN addition request acknowledgment message.

For example, the target MN receives the SN addition request acknowledgment message, to obtain the PDCP configuration that is of the at least one second DRB and that is configured by the target SN for the terminal.

Optionally, a full PDCP configuration sent by the target MN to the terminal may be configured by both the target MN and the target SN for the terminal. For example, a part of the full PDCP configuration may be configured by the target MN, and the other part of the full PDCP configuration is configured by the target SN. Alternatively, the full PDCP configuration sent by the target MN to the terminal may be all configured by the target SN for the terminal. This is not limited in the embodiments of this application.

In this embodiment, the target MN sends the SN addition request message to the target SN. After receiving the SN addition request message, the target SN allocates the radio resource to the terminal. After receiving the fifth indication and the full PDCP configuration that are sent by the target MN, the terminal may release the PDCP entity of the DRB established on the source SN, and add the full PDCP configuration allocated by the target access network device to the terminal. In this way, a configuration on a terminal side is consistent with a configuration on the target access network device side, to ensure service continuity of the terminal and improve user experience.

Figure 12:
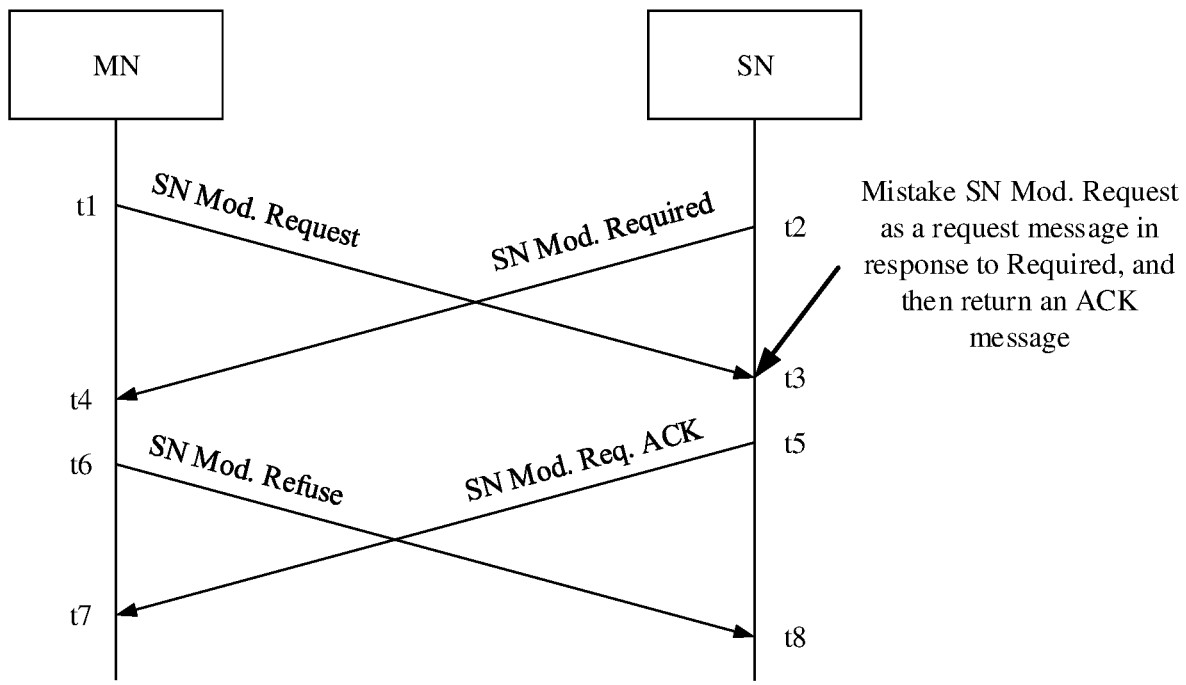
FIG. 12 is a schematic flowchart of another communication method according to an embodiment of this application.

In a DC network, when an SN triggers a modification procedure, an MN may also trigger a modification procedure. In this case, the SN may mistake an SN modification request message sent by the MN as an SN modification request message in response to an SN modification required message sent by the SN, and then returns a response message. Consequently, the MN and the SN fail to interact with each other due to misunderstanding. For example, as shown in FIG. 12, the MN and the SN almost simultaneously initiate a secondary base station modification procedure. The MN sends an SN modification request message to the SN at a moment t1, and the SN sends an SN modification required message to the MN at a moment t2. After receiving the SN modification required message at a moment t4, the MN refuses the application according to an existing solution, and then returns a modification request refuse (SN Modification Refuse) message to the SN at a moment t6. After sending the SN modification required message at the moment t2, the SN receives, at a moment t3, the SN modification request message sent by the MN, considers that the SN modification request message is in response to the SN modification required message sent by the SN at the moment t2, and then returns an SN modification request acknowledgment (SN Modification Request ACK) message. However, actually, the SN modification request message is not in response to the SN modification required message, but is a modification request actively initiated by the MN. Consequently, the MN and the SN have misunderstanding, and fail to interact with each other.

Figure 13:
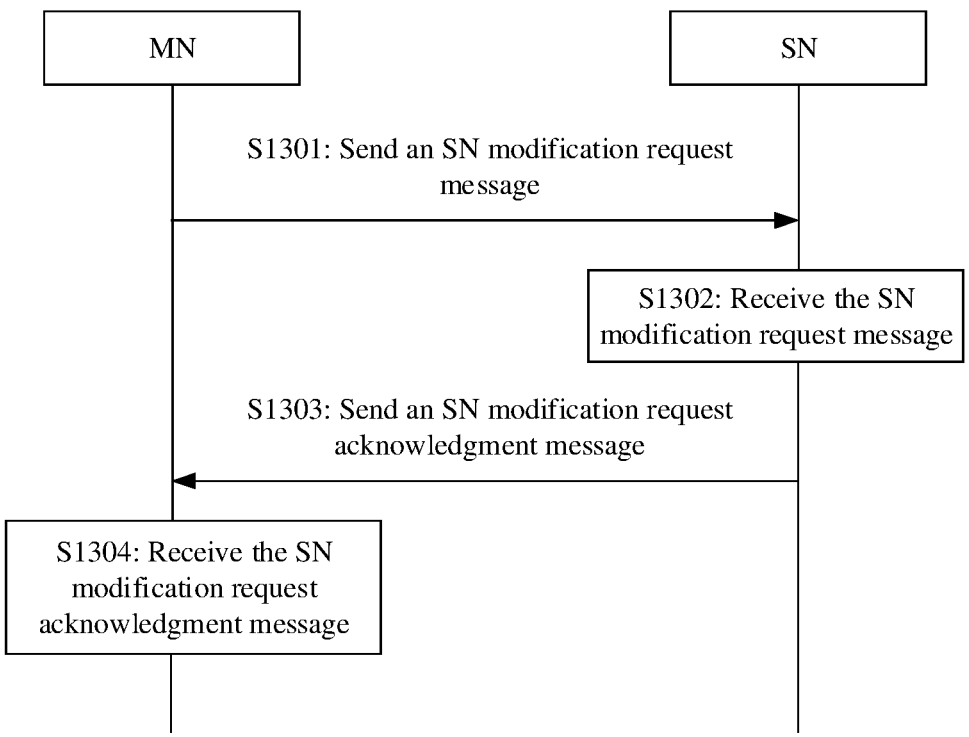
FIG. 13 is a schematic flowchart of another communication method according to an embodiment of this application.

An embodiment of this application further provides a communication method, to avoid an interaction failure caused by misunderstanding between an MN and an SN when a modification procedure triggered by the MN and a modification procedure triggered by the SN are simultaneously triggered. As shown in FIG. 13, the method includes steps S1301 to S1304.

S1301: The MN sends an SN modification request message to the SN.

The SN modification request message carries a first identifier. The first identifier may be used to identify an SN modification procedure. The SN modification procedure may be the modification procedure triggered by the MN, or may be the modification procedure triggered by the SN. This is not limited in the embodiments of this application.

For example, the first identifier may be a transaction identifier (transaction ID).

For example, a value of the first identifier carried in the SN modification request message is 3. The first identifier may identify the SN modification procedure. It may be understood that, herein, only an example in which the value of the first identifier is 3 is used for description. In example embodiments of the present disclosure, the value of the first identifier may be any natural number in 0 to 255.

S1302: The SN receives the SN modification request message.

For example, the SN receives the SN modification request message from the MN, and may identify the SN modification procedure based on the first identifier carried in the SN modification request message.

S1303: The SN sends an SN modification request acknowledgment message to the MN.

The SN modification request acknowledgment message carries an identifier that is the same as the first identifier. For example, that the SN modification request acknowledgment message carries an identifier that is the same as the first identifier may be understood as that the SN also includes an identifier in the SN modification request acknowledgment message sent to the MN, where a value of the identifier is the same as the value of the first identifier carried in the SN modification request message received by the SN from the MN. For example, that the SN modification request acknowledgment message carries an identifier that is the same as the first identifier may alternatively be understood as that the SN modification request acknowledgment message carries the first identifier. For example, a value of the transaction ID carried in the SN modification request acknowledgment message is also 3.

For example, in a same modification procedure, in response to the SN modification request message, the SN may include, in the SN modification request acknowledgment message, the identifier that is the same as the first identifier. In this way, the MN may determine, based on the identifier, that the SN modification request acknowledgment message and the SN modification request message are messages in the same modification procedure.

S1304: The MN receives the SN modification request acknowledgment message.

For example, the MN receives the SN modification request acknowledgment message from the SN, and may identify the SN modification procedure based on the first identifier carried in the SN modification request acknowledgment message. Because the identifier carried in the SN modification request acknowledgment message is the same as the identifier carried in the SN modification request message, the MN may determine that the SN modification request acknowledgment message is a message in response to the SN modification request message sent by the MN.

It may be understood that, in this embodiment, the first identifier that can identify the SN modification procedure is carried in the SN modification procedure, so that a network device may determine that messages that carry a same identifier are messages in the same SN modification procedure. This avoids a configuration failure caused by confusion between a secondary base station modification procedure triggered by the MN and a secondary base station modification procedure triggered by the SN.

Figure 14:
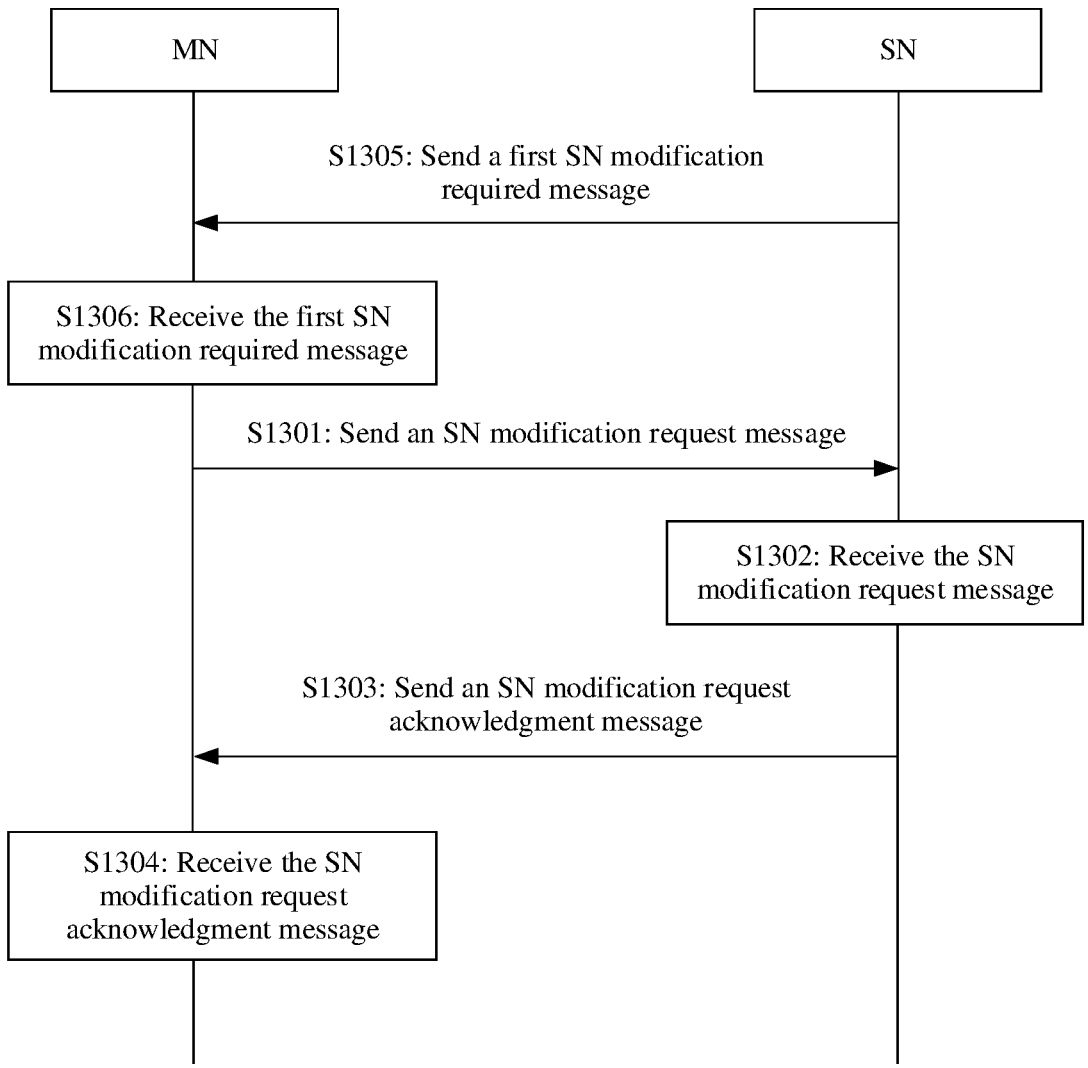
FIG. 14 is a schematic flowchart of another communication method according to an embodiment of this application.

Optionally, an embodiment of this application further provides a communication method. As shown in FIG. 14, before step S1301, steps S1305 and S1306 may be further included.

S1305: The SN sends a first SN modification required message to the MN.

The first SN modification required message carries a first identifier.

For example, the first SN modification required message that carries the first identifier is a message in a secondary base station modification procedure actively initiated by the SN.

It may be understood that, the SN modification request message that carries the first identifier in step S1301 is a request message in response to the first SN modification required message. Therefore, after receiving the SN modification request message that carries the first identifier in step S1302, the SN may determine that the SN modification request message is not an SN modification request message in the modification procedure actively initiated by the MN, but an SN modification request message in response to the first SN modification required message in step S1305. That is, the SN may identify, based on the first identifier, that the modification procedure is the secondary base station modification procedure initiated by the SN.

S1306: The MN receives the first SN modification required message.

For example, after receiving the first SN modification required message that carries the first identifier, the MN determines that the first SN modification required message is a message in the secondary base station modification procedure initiated by the SN. If the MN does not initiate a secondary base station modification procedure in this case, the MN sends, to the SN by performing step S1301, the SN modification request message that carries the identifier that is the same as the first identifier.

It may be understood that, in step S1306, the MN receives the first SN modification required message that carries the first identifier, and in step S1301, the MN sends, to the SN, the SN modification request message that carries the first identifier. In this procedure, the SN modification request message in step S1301 is in response to the first SN modification required message. The SN modification request message and the first SN modification required message are messages in a secondary base station modification procedure, and therefore carry identifiers having a same value.

In this embodiment, the first SN modification required message sent by the SN carries the first identifier, so that it can be identified that the modification procedure is the secondary base station modification procedure initiated by the SN. In this case, the MN may send, to the SN based on the first SN modification required message, the SN modification request message that carries the identifier that is the same as the first identifier carried in the first SN modification required message. Therefore, after receiving the SN modification request message that carries the identifier that is the same as the first identifier, the SN may determine that the SN modification request message is not the SN modification request message in the modification procedure actively initiated by the MN, but a request message in response to the first SN modification required message sent by the SN. This avoids a configuration failure caused by confusion between the secondary base station modification procedure triggered by the MN and the secondary base station modification procedure triggered by the SN.

Figure 15:
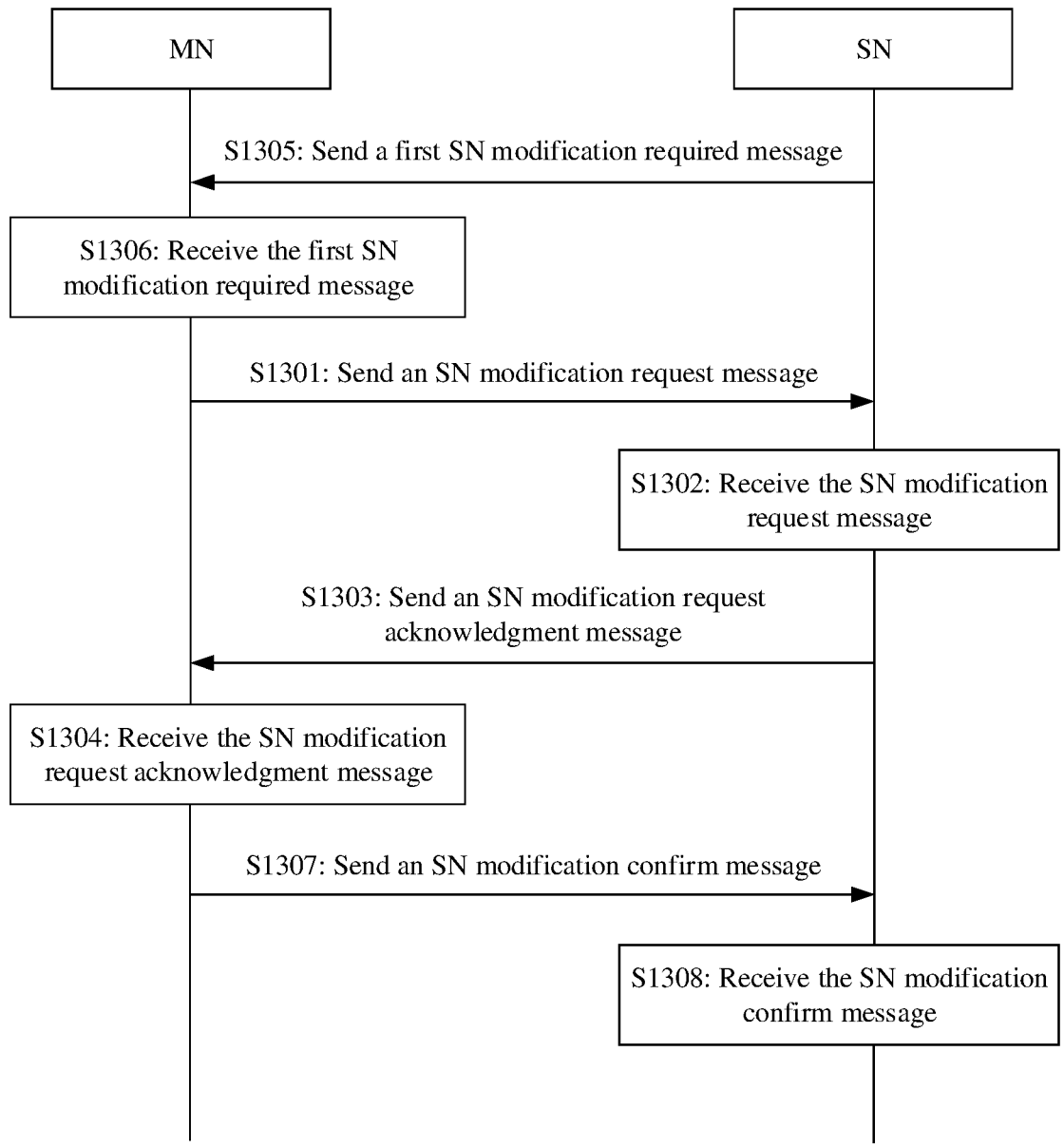
FIG. 15 is a schematic flowchart of another communication method according to an embodiment of this application.

An embodiment of this application further provides a communication method. As shown in FIG. 15, after step S1304, steps S1307 and S1308 may be further included.

S1307: The MN sends an SN modification confirm message to the SN.

Optionally, the SN modification confirm message carries an identifier that is the same as the first identifier. For example, that the SN modification confirm message carries an identifier that is the same as the first identifier may be understood as that the MN also includes an identifier in the SN modification confirm message sent to the SN, where a value of the identifier is the same as the value of the identifier carried in the SN modification request acknowledgment message received by the MN from the SN. For example, that the SN modification confirm message carries an identifier that is the same as the first identifier may alternatively be understood as that the SN modification confirm message carries the first identifier. That is, the SN modification confirm message is in response to the SN modification request acknowledgment message.

S1308: The SN receives the SN modification confirm message.

For example, after receiving the SN modification confirm message that carries the identifier that is the same as the first identifier, the SN learns that the SN modification confirm message is a message in the secondary base station modification procedure initiated by the SN.

Embodiments of this application provide a communication method. The SN sends the first SN modification required message to the MN, where the first SN modification required message carries the first identifier. The MN receives the first SN modification required message. The MN sends the SN modification request message to the SN, where the SN modification request message carries the first identifier. The SN receives the SN modification request message. The SN sends the SN modification request acknowledgment message to the MN, where the SN modification request acknowledgment message carries the identifier that is the same as the first identifier. The MN receives the SN modification request acknowledgment message. The MN sends the SN modification confirm message to the SN. The SN receives the SN modification confirm message. In embodiments, the identifier that can identify the SN modification procedure is carried in the SN modification procedure. This avoids the configuration failure caused by the confusion between the secondary base station modification procedure triggered by the MN and the secondary base station modification procedure triggered by the SN.

Figure 16:
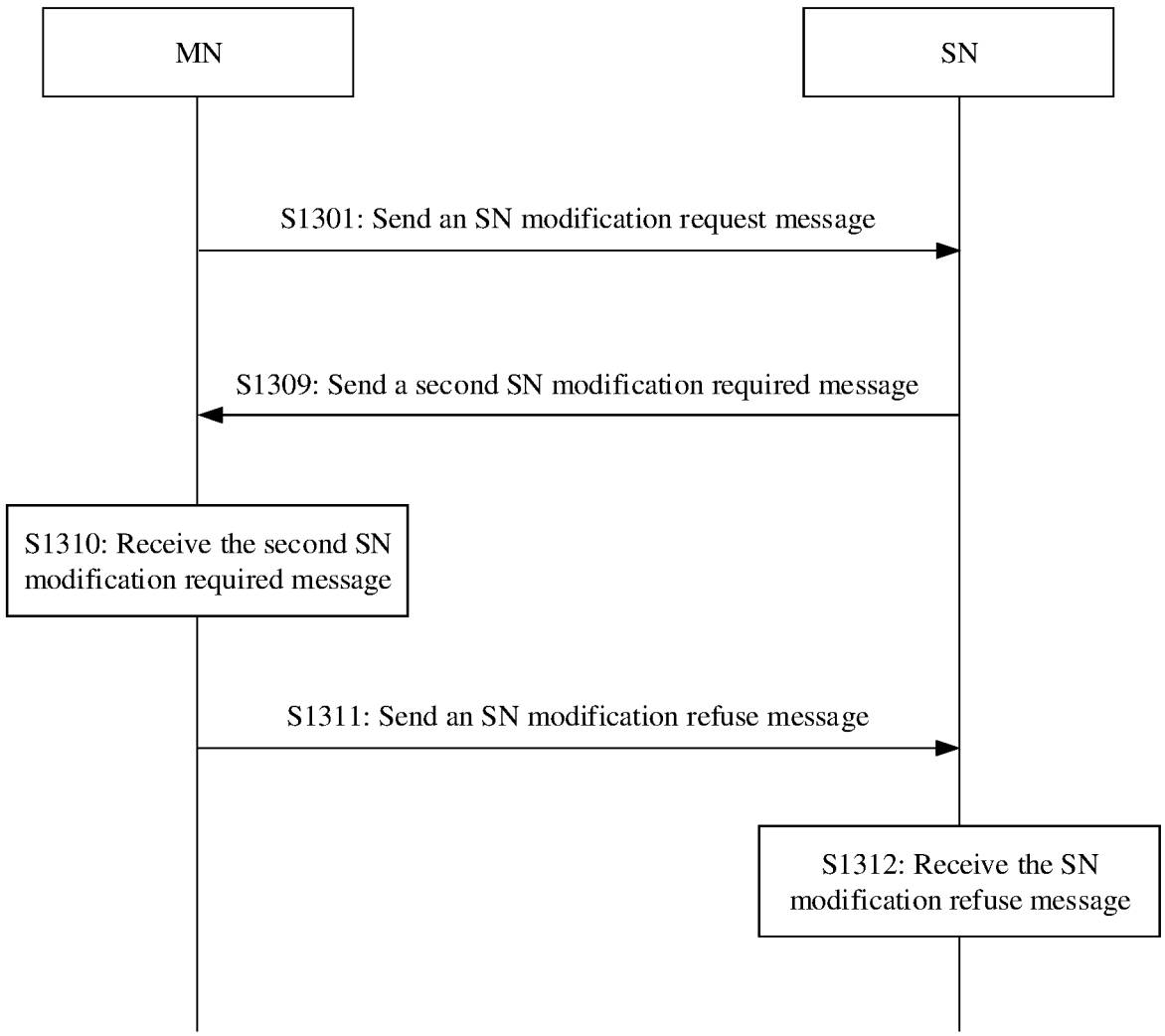
FIG. 16 is a schematic flowchart of another communication method according to an embodiment of this application.

An embodiment of this application further provides a communication method. As shown in FIG. 16, the foregoing method may further include steps S1309 to S1312.

S1309: The SN sends a second SN modification required message to the MN.

The second SN modification required message carries a second identifier. The second identifier is different from the first identifier in step S1301, and different identifiers are used to identify different SN modification procedures. For example, when the SN modification procedure identified by the first identifier in step S1301 is the secondary base station modification procedure triggered by the MN, the SN modification procedure identified by the second identifier in step S1309 is the secondary base station modification procedure triggered by the SN.

It may be understood that, because the SN modification request message in step S1301 and the second SN modification required message in step S1309 carry different identifiers, the SN modification request message in step S1301 is not an SN modification request message in response to the second SN modification required message sent by the SN, but an SN modification request message in the secondary base station modification procedure triggered by the MN.

S1310: The MN receives the second SN modification required message.

For example, the MN receives, from the SN, the second SN modification required message that carries the second identifier, and may determine that the second SN modification required message is a message in the secondary base station modification procedure initiated by the SN.

For example, steps S1309 and S1310 are performed after step S1301. It may be understood that steps S1309 and S1310 may alternatively be independent of steps S1301 to S1308 in the foregoing embodiments.

Optionally, before step S1310, the MN has sent, to the SN, the SN modification request message that carries the first identifier. Therefore, after receiving the second SN modification required message that carries the second identifier in step S1310, the MN may determine that the SN modification request message in step S1301 and the second SN modification required message are messages in different modification procedures, and determine that the second SN modification required message received by the MN conflicts with the SN modification request message in step S1301. In this case, the MN refuses the second SN modification required message, and performs steps S1311 and S1312. That is, the MN refuses the secondary base station modification procedure initiated by the SN.

S1311: The MN sends an SN modification refuse message to the SN.

Optionally, the SN modification refuse message carries an identifier that is the same as the second identifier.

S1312: The SN receives the SN modification refuse message.

For example, after receiving, from the MN, the SN modification refuse message that carries the identifier that is the same as the second identifier, the SN may determine that the MN refuses the secondary base station modification procedure initiated by the SN.

It may be understood that, in embodiments of this application, an identifier carried in each message in the secondary base station modification procedure initiated by the MN is different from an identifier carried in each message in the secondary base station modification procedure initiated by the SN. Therefore, the modification procedure initiated by the MN may be distinguished from the modification procedure initiated by the SN. This avoids a configuration failure caused by confusion between the secondary base station modification procedure triggered by the MN and the secondary base station modification procedure triggered by the SN.

Figure 17:
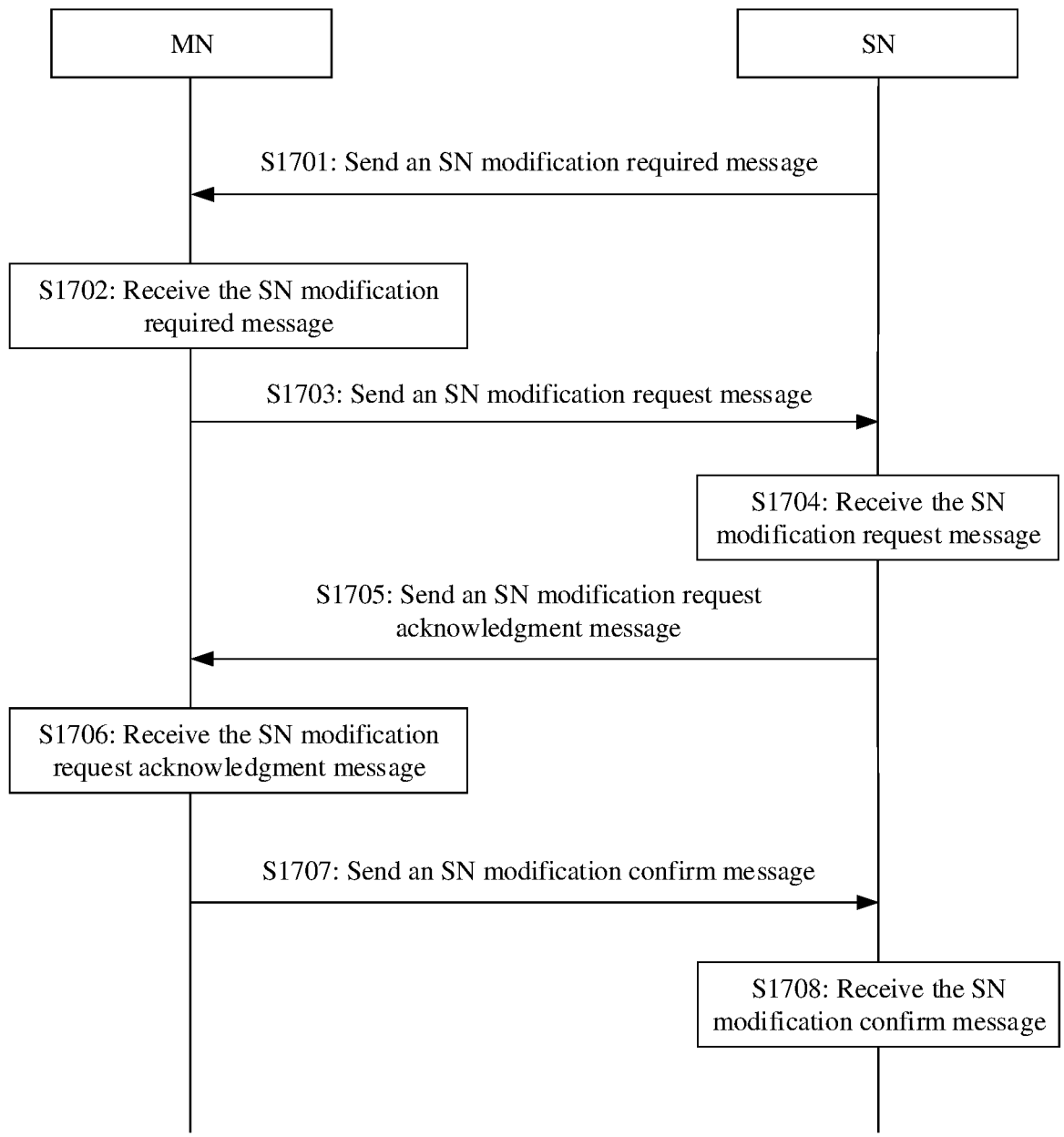
FIG. 17 is a schematic flowchart of another communication method according to an embodiment of this application.

For example, an embodiment of this application further provides a communication method, to avoid an interaction failure caused by misunderstanding between an MN and an SN when a modification procedure triggered by the MN and a modification procedure triggered by the SN are simultaneously triggered. In the method, a first identifier that can identify an SN modification procedure may be carried only in an SN modification required message and an SN modification request message. As shown in FIG. 17, the method includes steps S1701 to S1708.

S1701: The SN sends the SN modification required message to the MN, where the SN modification required message carries the first identifier.

For example, the first identifier is used to identify a secondary base station modification procedure. For example, the SN modification required message that carries the first identifier is a message in a secondary base station modification procedure initiated by the SN.

S1702: The MN receives the SN modification required message.

S1703: The MN sends the SN modification request message to the SN.

The SN modification request message carries an identifier that is the same as the first identifier. For example, that the SN modification request message carries an identifier that is the same as the first identifier may be understood as that the MN also includes an identifier in the SN modification request message sent to the SN, where a value of the identifier is the same as a value of the first identifier carried in the SN modification required message received by the MN from the SN. For example, that the SN modification request message carries an identifier that is the same as the first identifier may alternatively be understood as that the SN modification request message carries the first identifier. That is, the SN modification request message is in response to the SN modification required message.

For example, if the MN does not actively initiate a secondary base station modification procedure before receiving the SN modification required message that carries the first identifier, after receiving the SN modification required message that carries the first identifier, the MN sends the SN modification request message to the SN in response to the message, and includes, in the SN modification request message, the identifier that is the same as the first identifier. In this way, the SN can identify that the SN modification request message is a request message in response to the SN modification required message sent by the SN.

S1704: The SN receives the SN modification request message.

For example, after receiving the SN modification request message that carries the identifier that is the same as the first identifier, the SN may determine that the SN modification request message is the request message in response to the SN modification required message sent by the SN.

S1705: The SN sends an SN modification request acknowledgment message to the MN.

Optionally, the SN modification request acknowledgment message may carry an identifier that is the same as the first identifier. For example, that the SN modification request acknowledgment message carries an identifier that is the same as the first identifier may be understood as that the SN also includes an identifier in the SN modification request acknowledgment message sent to the MN, where a value of the identifier is the same as the value of the first identifier carried in the SN modification request message received by the SN from the MN. For example, that the SN modification request acknowledgment message carries an identifier that is the same as the first identifier may alternatively be understood as that the SN modification request acknowledgment message carries the first identifier. That is, the SN modification request acknowledgment message is in response to the SN modification request message.

S1706: The MN receives the SN modification request acknowledgment message.

S1707: The MN sends an SN modification confirm message to the SN.

Optionally, the SN modification confirm message may carry an identifier that is the same as the first identifier. For example, that the SN modification confirm message carries an identifier that is the same as the first identifier may be understood as that the MN also includes an identifier in the SN modification confirm message sent to the SN, where a value of the identifier is the same as the value of the identifier carried in the SN modification request acknowledgment message received by the MN from the SN. For example, that the SN modification confirm message carries an identifier that is the same as the first identifier may alternatively be understood as that the SN modification confirm message carries the first identifier. That is, the SN modification confirm message is in response to the SN modification request acknowledgment message.

S1708: The SN receives the SN modification confirm message.

It may be understood that, in this embodiment, the first identifier that can identify the SN modification procedure may be carried only in the SN modification required message and the SN modification request message, so that the SN modification request message in the modification procedure initiated by the SN can be distinguished from the SN modification request message in the modification procedure initiated by the MN, and the SN does not mistake the SN modification request message actively initiated by the MN as an SN modification request message in response to the SN modification required message initiated by the SN. This avoids a configuration failure caused by confusion between the secondary base station modification procedure triggered by the MN and the secondary base station modification procedure triggered by the SN.

The foregoing mainly describes the solutions provided in embodiments of this application from a perspective of method steps. It may be understood that, to implement the foregoing functions, a computer includes corresponding hardware structures and/or software modules for performing the functions. A person skilled in the art should be easily aware that, in combination with modules and algorithm steps of the examples described in embodiments disclosed in this specification, this application can be implemented by a combination of hardware and computer software. A person skilled in the art may use different methods to implement the described functions for each particular application, but it should not be considered that the implementation goes beyond the scope of this application.

In embodiments of this application, a communication apparatus may be divided into function modules based on the foregoing method example. For example, each function module may be obtained through division based on each corresponding function, or two or more functions may be integrated into one processing module. The integrated module may be implemented in a form of hardware, or may be implemented in a form of a software function module. It should be noted that, in embodiments of this application, division into the modules is an example, and is merely logical function division. During actual implementation, another division manner may be used.

Figure 18:
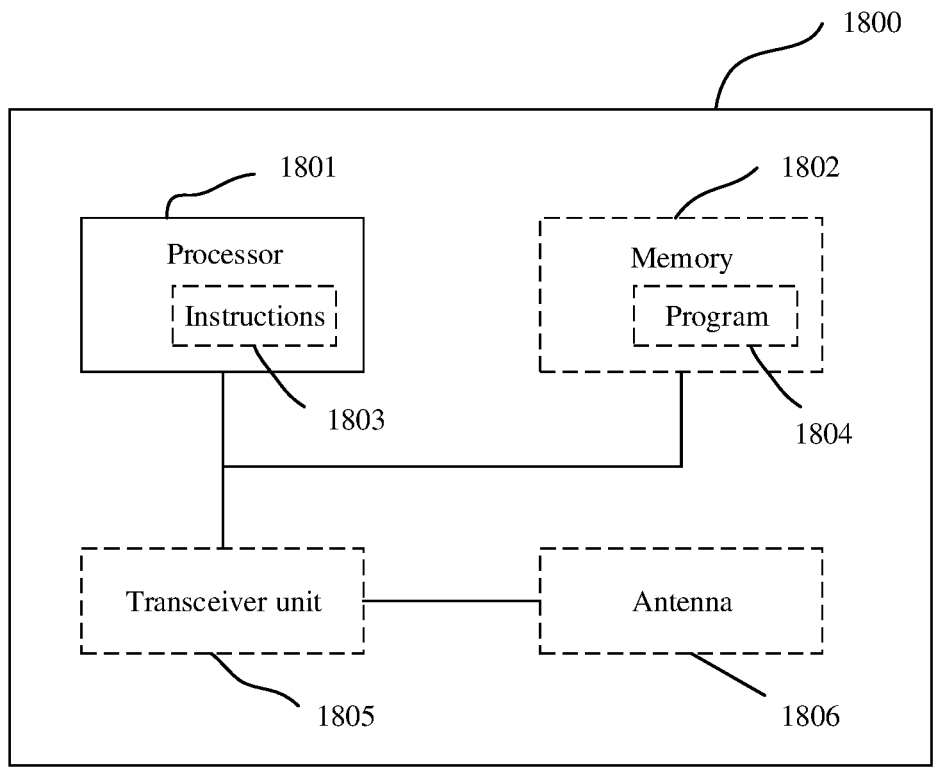
FIG. 18 is a schematic diagram of a structure of another communication apparatus according to an embodiment of this application.

FIG. 18 is a schematic diagram of a structure of a communication apparatus 1800 according to an embodiment of this application. The communication apparatus 1800 may be configured to implement the communication method described in the foregoing method embodiments. The communication apparatus 1800 may be a chip, an access network device, another wireless communication device, or the like.

The communication apparatus 1800 includes one or more processors 1801. The one or more processors 1801 may support the communication apparatus 1800 in implementing the method performed by the source access network device or the source MN in embodiments of this application, for example, the source access network device or the source MN in embodiments shown in FIG. 8 to FIG. 11. Alternatively, the one or more processors 1801 may support the communication apparatus 1800 in implementing the method performed by the MN or the SN in embodiments of this application, for example, the method performed by the MN or the SN in embodiments shown in FIG. 13 to FIG. 17.

The processor 1801 may be a general-purpose processor or a dedicated processor. For example, the processor 1801 may include a central processing unit (CPU) and/or a baseband processor. The baseband processor may be configured to process communication data (for example, the first information described above), and the CPU may be configured to implement corresponding control and processing functions, execute a software program, and process data of the software program.

Optionally, the processor 1801 may alternatively include instructions 1803, and the instructions may be run by the processor, to enable the communication apparatus 1800 to perform the method described in the foregoing method embodiments.

Further, the communication apparatus 1800 may further include a transceiver unit 1805, configured to input (receive) and output (send) a signal.

For example, the communication apparatus 1800 may be a chip, and the transceiver unit 1805 may be an input and/or output circuit of the chip. Alternatively, the transceiver unit 1805 may be an interface circuit of the chip, and the chip may be used as a component a base station, or another wireless communication device.

For another example, the communication apparatus 1800 may be an access network device, for example, a base station. The transceiver unit 1805 may include a transceiver or a radio frequency chip. The transceiver unit 1805 may further include a communication interface.

Optionally, the communication apparatus 1800 may further include an antenna 1806, which may be configured to support the transceiver unit 1805 in implementing a sending function and a receiving function of the communication apparatus 1800.

Optionally, the communication apparatus 1800 may include one or more memories 1802. The memory 1802 stores a program (or may be instructions or code) 1804, and the program 1804 may be run on the processor 1801, to enable the processor 1801 to perform the method described in the foregoing method embodiments. Optionally, the memory 1802 may further store data. Optionally, the processor 1801 may further read data (for example, predefined information) stored in the memory 1802. The data and the program 1804 may be stored at a same storage address, or may be stored at different storage addresses.

The processor 1801 and the memory 1802 may be separately disposed, or may be integrated together, for example, integrated on a single board or a system on chip (SOC).

In a possible design, the communication apparatus 1800 is an access network device or a chip that can be used in the access network device. The access network device may serve as a master node or a secondary node in DC communication. The master node manages a master cell group, and the secondary node manages a secondary cell group. The master cell group and/or the secondary cell group are/is used for data communication of a terminal.

For detailed descriptions of operations performed by the communication apparatus 1800 in the foregoing possible designs, refer to behavior of an access network device (the master node/secondary node) in embodiments of the communication method provided in this application, for example, related content in embodiments shown in FIG. 8 to FIG. 11. Details are not described again.

It should be understood that the steps in the foregoing method embodiments may be completed by using a logic circuit in a form of hardware or an instruction in a form of software in the processor 1801. The processor 1801 may be a CPU, a digital signal processor (DSP), an application-specific integrated circuit (ASIC), a field programmable gate array (FPGA), or another programmable logic device, for example, a discrete gate, a transistor logic device, or a discrete hardware component.

Figure 19:
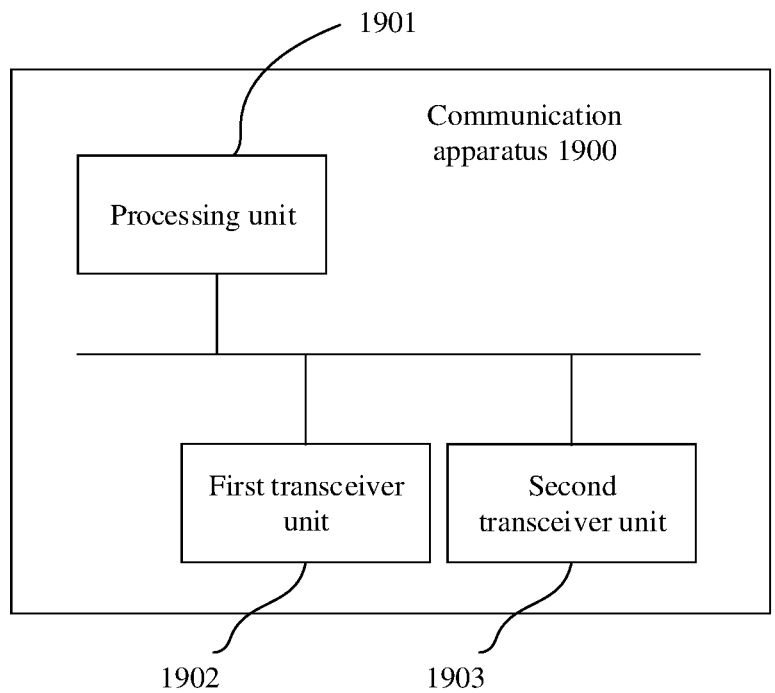
FIG. 19 is a schematic diagram of a component of a communication apparatus according to an embodiment of this application.

When an integrated unit is used, FIG. 19 is a schematic diagram of a possible structure of a communication apparatus 1900. The communication apparatus may be an access network device or a chip used in the access network device. The access network device may perform operations of the source access network device or the source MN in the foregoing method embodiments. The communication apparatus 1900 includes a processing unit 1901, a first transceiver unit 1902, and a second transceiver unit 1903. The first transceiver unit 1902 may be a transceiver unit between base stations, and the first transceiver unit 1902 may be implemented by a first transceiver. The first transceiver may be a communication interface, and is configured to perform communication between the communication apparatus 1900 and another network device. The second transceiver unit 1903 may be a transceiver unit between a base station and a terminal, and the second transceiver unit 1903 may be implemented by a second transceiver. The second transceiver may include a transceiver and an antenna, and is configured to perform communication between the communication apparatus 1900 and the terminal.

The processing unit 1901 may be configured to control and manage an action of the communication apparatus 1900, for example, control an operation of the first transceiver unit 1902.

The first transceiver unit 1902 may be configured to send at least one identifier of at least one first DRB to a target access network device, where the source access network device does not obtain a PDCP configuration of the first DRB. The first DRB may be a DRB established on a source SN. That is, the source MN does not obtain a PDCP configuration of the first DRB established on the source SN.

The first transceiver unit 1902 may be further configured to receive configuration information from the target access network device, where the configuration information includes first indication information, and the first indication information is used to indicate the terminal to release at least one PDCP entity of the at least one first DRB. Optionally, the configuration information further includes second indication information, and the second indication information is used to indicate the terminal to add at least one PDCP configuration of at least one second DRB.

The second transceiver unit 1903 may be configured to send the configuration information to the terminal.

Optionally, the first transceiver unit 1902 is further configured to receive the at least one identifier of the at least one first DRB from the source SN.

For example, the first transceiver unit 1902 may be further configured to perform step S1005 in FIG. 10 or S1001 and S1005 in FIG. 11, and/or is used in another process of the technology described in this specification. For example, the second transceiver unit 1903 may be further configured to perform step S1006 in FIG. 10 or FIG. 11, and/or is used in another process of the technology described in this specification. All related content of the steps in the foregoing method embodiments may be cited in function descriptions of a corresponding function module.

For example, in hardware implementation, a processor may perform a function of the processing unit 1901, a communication interface may perform a function of the first transceiver unit 1902, and a transceiver (transmitter/receiver) may perform a function of the second transceiver unit 1903. The processing unit 1901 may be embedded in or independent of the processor of the communication apparatus in a hardware form, or may be stored in a memory of a base station in a software form, so that the processor invokes and performs operations corresponding to the foregoing units. A hardware structure of the communication apparatus 1900 is shown in FIG. 18. Descriptions of all related content of components in FIG. 18 may be cited in function descriptions of corresponding components in the communication apparatus 1900.

Figure 20:
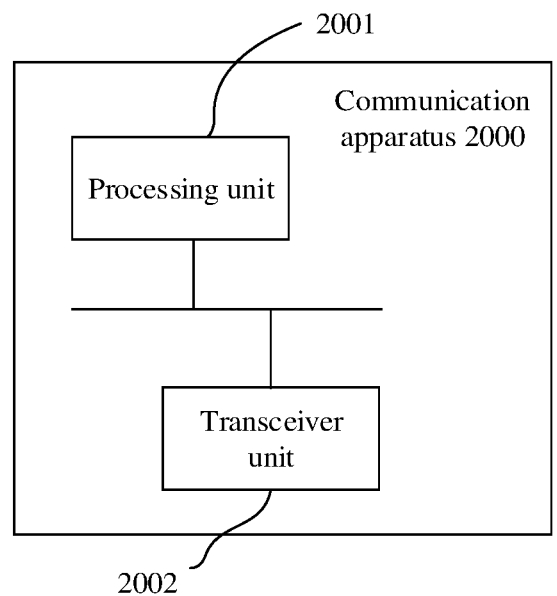
FIG. 20 is a schematic diagram of a structure of another communication apparatus according to an embodiment of this application.

When an integrated unit is used, FIG. 20 is a schematic diagram of a possible structure of a communication apparatus 2000. The communication apparatus 2000 may be an access network device or a chip used in the access network device. The access network device may perform operations of the target access network device (for example, a target MN) in the foregoing method embodiments. The communication apparatus 2000 includes a processing unit 2001 and a transceiver unit 2002.

The transceiver unit 2002 may be configured to receive at least one identifier of at least one first DRB, where a source access network device does not obtain a PDCP configuration of the first DRB. The first DRB may be a DRB established on a source SN. That is, a source MN does not obtain a PDCP configuration of the first DRB established on the source SN.

The processing unit 2001 may be configured to control and manage an action of the communication apparatus 2000, for example, control an operation of the transceiver unit 2002. For example, the processing unit 2001 may be configured to obtain configuration information. The configuration information includes first indication information, and the first indication information is used to indicate a terminal to release at least one PDCP entity of the at least one first DRB. Optionally, the configuration information further includes second indication information, and the second indication information is used to indicate the terminal to add at least one PDCP configuration of at least one second DRB.

The transceiver unit 2002 may be further configured to send the configuration information to the source access network device.

For example, the processing unit 2001 may be further configured to perform step S1003 in FIG. 10, and/or is used in another process of the technology described in this specification. For example, the transceiver unit 2002 may be further configured to perform steps S802, S804, S809, and S813 in FIG. 9, S1002 and S1004 in FIG. 10, or S1002, S1004, S1009, and S1012 in FIG. 11, and/or is used in another process of the technology described in this specification. All related content of the steps in the foregoing method embodiments may be cited in function descriptions of a corresponding function module.

For example, in hardware implementation, a processor may perform a function of the processing unit 2001, and a transceiver (transmitter/receiver) and/or a communication interface may perform a function of the transceiver unit 2002. The processing unit 2001 may be embedded in or independent of the processor of the communication apparatus 2000 in a hardware form, or may be stored in a memory of the communication apparatus 2000 in a software form, so that the processor invokes and performs operations corresponding to the foregoing units.

Figure 21:
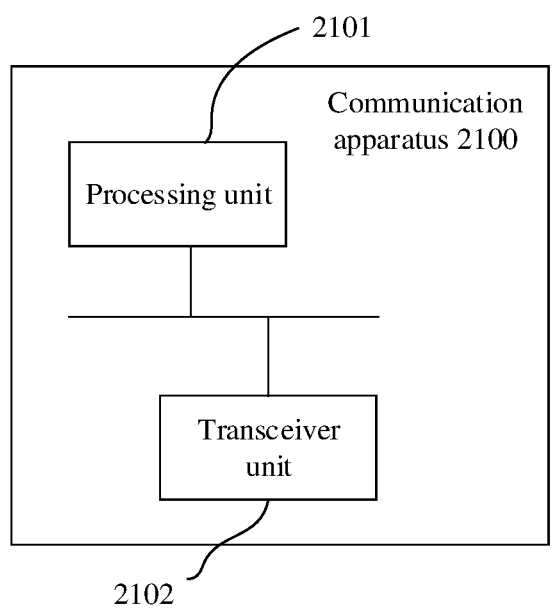
FIG. 21 is a schematic diagram of a structure of another communication apparatus according to an embodiment of this application.

When an integrated unit is used, FIG. 21 is a schematic diagram of a possible structure of a communication apparatus 2100. The communication apparatus may be the terminal in the foregoing embodiments, or an apparatus, for example, a chip, used in the terminal. The communication apparatus 2100 includes a processing unit 2101 and a transceiver unit 2102.

The transceiver unit 2102 is configured to receive configuration information from a source access network device, where the configuration information includes first indication information, and the first indication information is used to indicate the terminal to release a PDCP entity of at least one first DRB. Optionally, the configuration information further includes second indication information, and the second indication information is used to indicate the terminal to add at least one PDCP configuration of at least one second DRB.

The processing unit 2101 is configured to release the at least one PDCP entity of the at least one first DRB based on the first indication information in the configuration information. Optionally, the processing unit 2101 is further configured to add, based on the second indication information in the configuration information, the At least one PDCP configuration of the at least one second DRB.

For example, the processing unit 2101 may be further configured to perform step S1008 in FIG. 10, and/or is used in another process of the technology described in this specification. For example, the transceiver unit 2102 may be further configured to perform step S1007 in FIG. 10, and/or is used in another process of the technology described in this specification. All related content of the steps in the foregoing method embodiments may be cited in function descriptions of a corresponding function module.

For example, in hardware implementation, a processor may perform a function of the processing unit 2101, and a transceiver (transmitter/receiver) and/or a communication interface may perform a function of the transceiver unit 2102. The processing unit 2101 may be embedded in or independent of the processor of the communication apparatus 2100 in a hardware form, or may be stored in a memory of the communication apparatus 2100 in a software form, so that the processor invokes and performs operations corresponding to the foregoing units.

Figure 22:
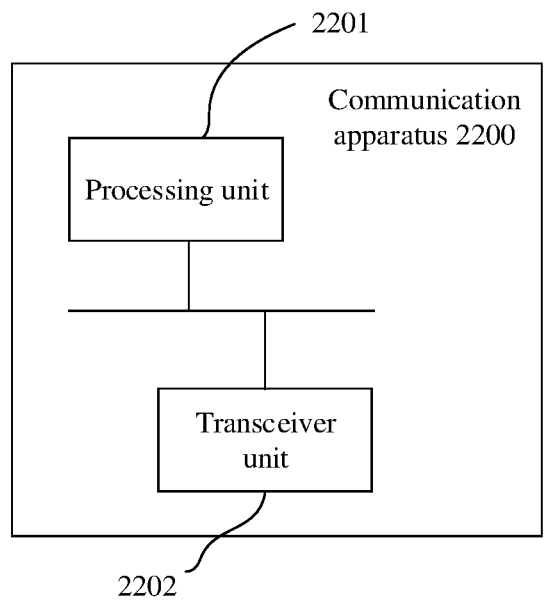
FIG. 22 is a schematic diagram of a structure of another communication apparatus according to an embodiment of this application.

When an integrated unit is used, FIG. 22 is a schematic diagram of a possible structure of a communication apparatus 2200. The communication apparatus may be a base station or a chip used in the base station, and may perform an operation of the master node (MN) in embodiments shown in FIG. 13 to FIG. 17. The communication apparatus 2200 includes a processing unit 2201 and a transceiver unit 2202.

The transceiver unit 2202 is configured to send an SN modification request message to an SN. The SN modification request message carries a first identifier. The first identifier may be used to identify an SN modification procedure. The SN modification procedure may be a modification procedure triggered by the MN, or may be a modification procedure triggered by the SN.

The transceiver unit 2202 is further configured to receive an SN modification request acknowledgment message from the SN. The SN modification request acknowledgment message carries an identifier that is the same as the first identifier.

The processing unit 2201 is configured to determine, based on the first identifier carried in the SN modification request acknowledgment message, that the SN modification request acknowledgment message is in response to the SN modification request message sent by the transceiver unit 2202.

For example, the processing unit 2201 may be further configured to distinguish between different secondary base station modification procedures based on identifiers carried in the messages, and/or is used in another process of the technology described in this specification. For example, the transceiver unit 2202 may be further configured to perform steps S1306, S1301, and S1304 in FIG. 14, S1301, S1304, S1306, and S1307 in FIG. 15, S1301, S1310, and S1311 in FIG. 16, or S1702, S1703, S1706, and S1707 in FIG. 17, and/or is used in another process of the technology described in this specification. All related content of the steps in the foregoing method embodiments may be cited in function descriptions of a corresponding function module.

For example, in hardware implementation, a processor may perform a function of the processing unit 2201, and a transceiver (transmitter/receiver) and/or a communication interface may perform a function of the transceiver unit 2202. The processing unit 2201 may be embedded in or independent of the processor of the communication apparatus 2200 in a hardware form, or may be stored in a memory of the communication apparatus 2200 in a software form, so that the processor invokes and performs operations corresponding to the foregoing units.

Figure 23:
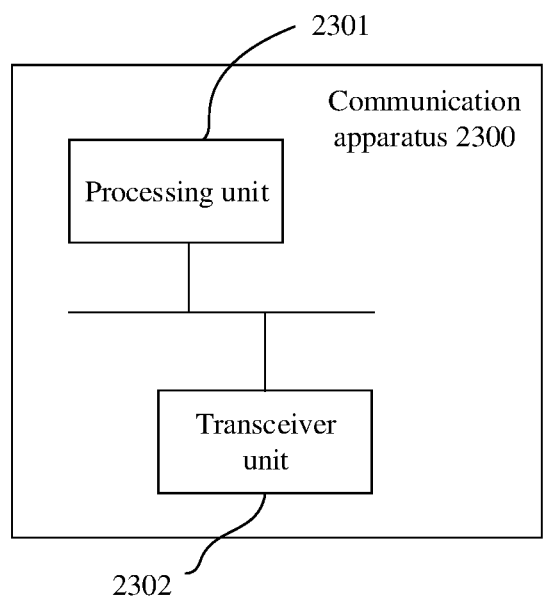
FIG. 23 is a schematic diagram of a structure of another communication apparatus according to an embodiment of this application.

When an integrated unit is used, FIG. 23 is a schematic diagram of a possible structure of a communication apparatus 2300. The communication apparatus may be a base station or a chip used in the base station, and may perform an operation of the secondary node (SN) in embodiments shown in FIG. 13 to FIG. 17. The communication apparatus 2300 includes a processing unit 2301 and a transceiver unit 2302.

The transceiver unit 2302 is configured to receive an SN modification request message from an MN. The SN modification request message carries a first identifier. The first identifier may be used to identify an SN modification procedure. The SN modification procedure may be a modification procedure triggered by the MN, or may be a modification procedure triggered by the SN.

The transceiver unit 2302 is further configured to send an SN modification request acknowledgment message to the MN. The SN modification request acknowledgment message carries an identifier that is the same as the first identifier.

The processing unit 2301 is configured to include, in the SN modification request acknowledgment message in response to the SN modification request message, the identifier that is the same as the first identifier.

For example, the processing unit 2301 may be further configured to distinguish between different secondary base station modification procedures based on identifiers carried in the messages, and/or is used in another process of the technology described in this specification. For example, the transceiver unit 2302 may be further configured to perform steps S1305, S1302, and S1303 in FIG. 14, S1305, S1302, S1303, and S1308 in FIG. 15, S1309 and S1312 in FIG. 16, or S1701, S1704, S1705, and S1708 in FIG. 17, and/or is used in another process of the technology described in this specification. All related content of the steps in the foregoing method embodiments may be cited in function descriptions of a corresponding function module.

For example, in hardware implementation, a processor may perform a function of the processing unit 2301, and a transceiver (transmitter/receiver) and/or a communication interface may perform a function of the transceiver unit 2302. The processing unit 2301 may be embedded in or independent of the processor of the communication apparatus 2300 in a hardware form, or may be stored in a memory of the communication apparatus 2300 in a software form, so that the processor invokes and performs operations corresponding to the foregoing units.

An embodiment of this application further provides a communication apparatus. The communication apparatus includes a processor, and may further include a transceiver and a memory. The transceiver is configured to send and receive information, or is configured to communicate with another network element. The memory is configured to store computer-executable instructions. The processor is configured to execute the computer-executable instructions, to support a terminal device in implementing the communication method in any one of embodiments in FIG. 8 to FIG. 11, or FIG. 13 to FIG. 17.

An embodiment of this application further provides a communication apparatus. The communication apparatus includes a processor, and may further include a transceiver and a memory. The transceiver is configured to send and receive information, or is configured to communicate with another network element. The memory is configured to store computer-executable instructions. The processor is configured to execute the computer-executable instructions, to support an access network device, for example, a base station, in implementing the communication method in any one of embodiments in FIG. 8 to FIG. 11, or FIG. 13 to FIG. 17.

An embodiment of this application further provides a computer storage medium. The computer storage medium stores computer program code. When the computer program code is executed by a processor, an electronic device performs the communication method in any one of embodiments in FIG. 6 to FIG. 11, or FIG. 13 to FIG. 17.

An embodiment of this application further provides a computer program product. When the computer program product runs on a computer, the computer is enabled to perform the communication method in any one of embodiments in FIG. 6 to FIG. 11, or FIG. 13 to FIG. 17.

An embodiment of this application further provides a communication apparatus. The apparatus may exist in a product form of a chip. A structure of the apparatus includes a processor and an interface circuit. The processor is configured to communicate with another apparatus through a receiver circuit, to enable the apparatus to perform the communication method in any one of embodiments in FIG. 6 to FIG. 11, or FIG. 13 to FIG. 17.

An embodiment of this application further provides a communication system. The communication system includes a source access network device and a target access network device. The source access network device and the target access network device may perform the communication method in any one of embodiments in FIG. 6 to FIG. 11.

An embodiment of this application further provides a communication system. The communication system includes a master node and a secondary node. The master node and the secondary node may perform the communication method in any one of embodiments in FIG. 13 to FIG. 17.

The methods or algorithm steps described in combination with the content disclosed in this application may be implemented by hardware, or may be implemented by a processor executing software instructions. The software instructions may include a corresponding software module. The software module may be stored in a random access memory (RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in one or more of the foregoing examples, the functions described in this application may be implemented by using hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that enables a computer program to be transmitted from one place to another. The storage medium may be any available medium accessible by a general-purpose or dedicated computer.

The objectives, technical solutions, and beneficial effects of this application are further described in detail in the foregoing specific implementations. It should be understood that the foregoing descriptions are merely non-limiting examples of specific implementations and are not intended to limit the protection scope, which is intended to cover any modification, equivalent replacement, or improvement made based on the technical solutions of this application.

What is claimed is:

1. A communications system, comprising a source access network device, and a target access network device, wherein a handover of a terminal is performed from the source access network device to the target access network device,
   the source access network device is configured to send at least one identifier of at least one first data radio bearer (DRB) to the target access network device, wherein the source access network device does not obtain a packet data convergence protocol (PDCP) configuration of the at least one first DRB;
   the target access network device is configured to receive the at least one identifier of the at least one first DRB from the source access network device, and obtain configuration information, wherein the configuration information comprises first indication information, and the first indication information indicates the terminal to release at least one PDCP entity of the at least one first DRB; and send the configuration information to the source access network device; and
   the source access network device is further configured to receive the configuration information from the target access network device, and send the configuration information to the terminal.

2. The communications system according to claim 1, wherein
the configuration information further comprises second indication information, and the second indication information indicates the terminal to add at least one PDCP configuration of at least one second DRB.

3. The communications system according to claim 2, wherein the at least one first DRB and the at least one second DRB correspond to a same radio access bearer (E-RAB).

4. The communications system according to claim 1, wherein the source access network device is a source master node (MN) of the terminal during dual connectivity communication.

5. The communications system according to claim 4, each of the at least one first DRB is a DRB established on a source secondary node (SN) of the terminal during dual connectivity communication.

6. The communications system according to claim 5, wherein the source access network device is further configured to receive the at least one identifier of the at least one first DRB from the source SN.

7. The communications system according to claim 5, wherein the target access network device is configured to receive a third indication from a target secondary node (SN), wherein the third indication indicates the terminal to release one or more PDCP entities of some or all of the at least one first DRB.

8. A source access network device, comprising:
a memory storing instructions, and
at least one processor in communication with the memory, the at least one processor being configured, upon execution of the instructions, to enable the source access network device to perform operations comprising:
sending at least one identifier of at least one first data radio bearer (DRB) to a target access network device, wherein the source access network device does not obtain a packet data convergence protocol (PDCP) configuration of the at least one first DRB;
receiving configuration information from the target access network device, wherein the configuration information comprises first indication information, and the first indication information indicates a terminal to release at least one PDCP entity of the at least one first DRB; and
sending the configuration information to the terminal.

9. The source access network device according to claim 8, wherein the configuration information further comprises second indication information, and the second indication information indicates the terminal to add at least one PDCP configuration of at least one second DRB.

10. The source access network device according to claim 9, wherein the at least one first DRB and the at least one second DRB correspond to a same radio access bearer (E-RAB).

11. The source access network device according to claim 8, wherein the source access network device is a source master node (MN) of the terminal during dual connectivity communication.

12. The source access network device according to claim 11, wherein each of the at least one first DRB is a DRB established on a source secondary node (SN) of the terminal during dual connectivity communication.

13. The source access network device according to claim 12, wherein the memory further comprises instructions that, when executed by the at least one processor, cause the source access network device to perform operations comprising:
receiving the at least one identifier of the at least one first DRB from the source SN.

14. A target access network device, comprising:
a memory storing instructions; and
at least one processor in communication with the memory, the at least one processor being configured, upon execution of the instructions, to enable the target access network device to perform operations comprising:
receiving at least one identifier of at least one first data radio bearer (DRB) from a source access network device, wherein the source access network device does not obtain a packet data convergence protocol (PDCP) configuration of the at least one first DRB;
obtaining configuration information, wherein the configuration information comprises first indication information, and the first indication information indicates a terminal to release at least one PDCP entity of the at least one first DRB; and
sending the configuration information to the source access network device.

15. The target access network device according to claim 14, wherein the configuration information further comprises second indication information, and the second indication information indicates the terminal to add at least one PDCP configuration of at least one second DRB.

16. The target access network device according to claim 15, wherein the at least one first DRB and the at least one second DRB correspond to a same radio access bearer (E-RAB).

17. The target access network device according to claim 14, wherein the source access network device is a source master node (MN) of the terminal during dual connectivity communication, the target access network device is a target MN of the terminal during the dual connectivity communication, and each of the at least one first DRB is a DRB established on a source secondary node (SN) of the terminal during the dual connectivity communication,
the memory further comprises instructions that, when executed by the at least one processor, cause the target access network device to:
send one or more identifiers of some or all of the at least one first DRB to a target secondary node (SN) of the terminal during the dual connectivity communication.

18. The target access network device according to claim 17, wherein obtaining configuration information comprises:
receiving a third indication from the target SN, wherein the third indication indicates the terminal to release one or more PDCP entities of the some or all of the at least one first DRB.

19. A communications apparatus, comprising:
a memory storing instructions; and
at least one processor in communication with the memory, the at least one processor being configured, upon execution of the instructions, to perform operations comprising:
receiving configuration information from a source access network device, wherein the configuration information comprises first indication information, the first indication information indicates the communications apparatus to release at least one packet data convergence protocol (PDCP) entity of at least one first data radio bearer (DRB), and the source access network device does not obtain a PDCP configuration of the at least one first DRB; and
releasing the at least one PDCP entity of the at least one first DRB based on the configuration information.

20. The communications apparatus according to claim 19, wherein the configuration information further comprises second indication information, and the second indication information indicates the communications apparatus to add at least one PDCP configuration of at least one second DRB.

21. The communications apparatus according to claim 20, wherein the at least one first DRB and the at least one second DRB correspond to a same radio access bearer (E-RAB).

* * * * *